(12) United States Patent
Chen et al.

(10) Patent No.: US 12,240,194 B2
(45) Date of Patent: Mar. 4, 2025

(54) METHOD OF MANUFACTURING MULTICOLOR SHOE MATERIAL, SEMI-FINISHED SHOE MATERIAL, AND MULTICOLOR SHOE MATERIAL

(71) Applicants: Yi-Liang Chen, Taichung (TW); Pao-Hsin Wang, Taichung (TW)

(72) Inventors: Yi-Liang Chen, Taichung (TW); Pao-Hsin Wang, Taichung (TW)

(73) Assignee: GLORY STEEL ENTERPRISE CO., LTD., Taichung (TW)

( * ) Notice: Subject to any disclaimer, the term of this patent is extended or adjusted under 35 U.S.C. 154(b) by 183 days.

(21) Appl. No.: 17/719,765

(22) Filed: Apr. 13, 2022

(65) Prior Publication Data

US 2023/0191735 A1 Jun. 22, 2023

(30) Foreign Application Priority Data

Dec. 21, 2021 (TW) ................................. 110147852

(51) Int. Cl.
*B29D 35/00* (2010.01)
*A43B 1/00* (2006.01)
(Continued)

(52) U.S. Cl.
CPC ........ *B29D 35/0009* (2013.01); *A43B 1/0027* (2013.01); *A43B 1/14* (2013.01);
(Continued)

(58) Field of Classification Search
None
See application file for complete search history.

(56) References Cited

U.S. PATENT DOCUMENTS 5,972,257 A * 10/1999 Liu ..................... B29D 35/0009
264/161
6,129,798 A * 10/2000 Yang .................... B29D 35/122
264/161
(Continued)

FOREIGN PATENT DOCUMENTS

CN 1247797 A 3/2000
CN 102223816 A 10/2011
(Continued)

OTHER PUBLICATIONS

Search Report for PCT/CN2021/140104, Issued on Aug. 31, 2022, Total of 2 pages.
(Continued)

*Primary Examiner* — Nahida Sultana
(74) *Attorney, Agent, or Firm* — Apex Juris, pllc; Hilde Coeckx

(57) ABSTRACT

A method of manufacturing a multicolor shoe material includes the following steps. Step S1: blank molds are provided, and a mold chamber of each of the blank molds is injected by one of the foamed materials in different colors to form unfoamed semi-finished products in different colors. Step S2: the semi-finished products are put into a foaming mold, when the foaming mold is preheated and completely closed, a ratio of a total volume of the semi-finished products to a volume of the mold chamber of the foaming mold is ranged between 0.96 and 1.04. Thus, the semi-finished products could be evenly foamed. After foaming, adjacent two of the semi-finished products could be connected by heat fusion to obtain the multicolor shoe material. Additionally, a semi-finished product and a multicolor shoe material are provided in the present invention.

10 Claims, 29 Drawing Sheets

(51) Int. Cl.
*A43B 1/14* (2006.01)
*B29K 21/00* (2006.01)
*B29K 23/00* (2006.01)
*B29K 105/04* (2006.01)

(52) U.S. Cl.
CPC .. *B29K 2021/003* (2013.01); *B29K 2023/083* (2013.01); *B29K 2105/04* (2013.01)

(56) References Cited

U.S. PATENT DOCUMENTS

| | | | | |
|---|---|---|---|---|
| 6,743,385 | B2* | 6/2004 | Wang | B29C 44/12 |
| | | | | 264/161 |
| 6,787,079 | B2* | 9/2004 | Liu | B29D 35/142 |
| | | | | 264/46.4 |
| 7,118,793 | B2* | 10/2006 | Wang | B29C 44/12 |
| | | | | 428/908.8 |
| 11,129,438 | B2* | 9/2021 | Kilgore | A43B 7/14 |
| 2008/0005856 | A1 | 1/2008 | Hung | |
| 2015/0223563 | A1 | 8/2015 | Liebeno et al. | |
| 2016/0354983 | A1* | 12/2016 | Kakimoto | B29C 44/1233 |
| 2019/0366590 | A1* | 12/2019 | Farris | B29C 70/64 |
| 2019/0366667 | A1 | 12/2019 | Cross et al. | |
| 2021/0114324 | A1* | 4/2021 | Liu | B29D 35/122 |

FOREIGN PATENT DOCUMENTS

| | | | | |
|---|---|---|---|---|
| CN | 103917359 | | 7/2014 | |
| CN | 106273596 | A | 1/2017 | |
| CN | 108032478 | A | 5/2018 | |
| CN | 108297333 | A | 7/2018 | |
| EP | 3114954 | B1 * | 2/2020 | .......... A43B 1/0009 |
| JP | 2000270901 | A | 10/2000 | |
| TW | 514584 | 3 | 12/2002 | |
| TW | 575488 | B | 2/2004 | |
| TW | 592941 | B | 6/2004 | |

OTHER PUBLICATIONS

Translation of Abstract of CN106273596, Total of 1 page.
Translation of Abstract of CN1247797, Total of 1 page.
Translation of Abstract of CN102223816, Total of 1 page.
Translation of Abstract of CN108297333, Total of 1 page.
Translation of Abstract of JP2000270901, Total of 1 page.
Translation of Abstract of CN108032478. Total of 1 page.
Search Report for TW110147852, Issued on May 25, 2022, Total of 1 page.
Translation of Abstract of TW575488, Total of 1 page.
Translation of Abstract of TW592941, Total of 1 page.
Translation of Abstract of TW514584, Total of 1 page.
English abstract for CN103917359, Total of 1 page.

* cited by examiner

METHOD OF MANUFACTURING MULTICOLOR SHOE MATERIAL, SEMI-FINISHED SHOE MATERIAL, AND MULTICOLOR SHOE MATERIAL

BACKGROUND OF THE INVENTION

Technical Field

The present invention relates generally to a technique of manufacturing a multicolor shoe material, and more particularly to a method of manufacturing a multicolor shoe material by foaming in a mold to integrally fuse foaming materials, a semi-finished product, and the multicolor shoe material thereof.

Description of Related Art

Nowadays, a shoe style that is uniquely colorful and multifunctional is loved and valued by consumers. With a traditional shoe manufacturing method, a multicolor shoe material is manufactured by combining two shoe components in different colors or physical properties via glue.

However, said glue process usually includes doing a complicated surface treatment with chemical primer to the shoe components before applying the glue. Besides, after shoe components are attached, the attached shoe components need to be heated by a conveyor oven to improve the adhesive strength of the glue. Therefore, a conventional method of manufacturing the multicolor shoe material is costly, and a lot of manpower is involved in said production. Additionally, a chemical agent used for the surface treatment is toxic, which is harmful to laborers who work in the factory. The oven would significantly increase carbon dioxide emissions. The conventional multicolor shoe material has a risk of delamination, which reduces the quality and the safety of the product.

There are a few techniques are provided for improving the defects of the traditional multicolor shoe material, such as China invention patent publication No. CN103917359A. The patent discloses a foaming process is used to combine two foamed bodies into one. A first preformed body and the second preformed body are put into a first cavity of a mold, wherein the first preformed body and the second preformed body are in different colors. Then, the first cavity and a second cavity are coupled to close the mold. The mold is heated to a predetermined temperature, the first preformed body and the second preformed body are melted to fuse together, thereby obtaining a shoe sole having two colors.

However, a product manufactured by the method disclosed in the patent is not perfect, such as a color of the first preformed body is easy to invade into the second preformed body, and vice versa. Therefore, the manufacturer has to spend time and manpower to use color paint to cover the color cross portion, which is not cost-effective, and the color paint is a chemical material that is harmful to humans and the environment.

Additionally, the conventional method is unable to feed the foaming material precisely into the foaming mold, so that the product is easy to have a parting flash and unsmooth surface to become a defective product, thereby increasing the burden to Earth.

Thus, all above method for manufacturing the multicolor shoe material has space for improvement.

BRIEF SUMMARY OF THE INVENTION

In view of the above, the primary objective of the present invention is to provide a method of manufacturing a multicolor shoe material, a semi-finished product therefor, and the multicolor shoe material. By utilizing a ratio of a total volume of the semi-finished products to a volume of a mold chamber of a foaming mold, the foaming mold could be precisely fed with the semi-finished products, enabling the semi-finished products that are in different colors and have different physical properties to be foamed evenly and thermally fused. Besides, a color of one of the semi-finished products is not going to invade into any other semi-finished products. By using the method, a yield of the multicolor shoe material is enhanced, a defect rate of the manufacturing method is lower than 10%. An appearance of the multicolor shoe material is more aesthetic The inventive subject matter provides a method of manufacturing a multicolor shoe material includes the following steps. Step S1: a plurality of blank molds are provided, and a mold chamber of each of the blank molds is injected by one of a plurality of foaming materials in different colors, so that the blank molds form the foaming materials to obtain a plurality of semi-finished products that are in different colors and unfoamed. Step S2: the semi-finished products are cooled down and put into a foaming mold, wherein when the foaming mold is closed, a ratio of the total volume of the semi-finished products to the volume of a mold chamber of the foaming mold is ranged between 0.96 to 1.04, enabling the semi-finished products to be foamed evenly in the mold chamber of the foaming mold. After a foaming process, any two of the semi-finished products that abut each other are thermally fused with each other, and the multicolor shoe material is formed.

The inventive subject matter further provides a semi-finished product, which is an unfoamed body and is divided into a plurality of sections. The sections include a front section, a rear section, and a middle section, wherein the middle section is located between the front section and the rear section, wherein a density difference between any two of the front section, the rear section, and the middle section is in a range of 1% to 3%.

The inventive subject matter further provides a multicolor shoe material, including a first foamed color body and a second foamed color body. The first foamed color body and the second foamed color body are thermally fused. The multicolor shoe material is defined to have a parting line, wherein the first foamed color body is divided into a first section and a second section by the parting line, and the second foamed color body is divided into a third section and a fourth section by the parting line. A density difference between the first section and the second section is in a range of 1% to 3%. The multicolor shoe material is defined to have a first plane, wherein the first plane is an adhesive interface between the first foamed color body and the second foamed color body.

With the aforementioned design, the method of manufacturing the multicolor shoe material of the present invention utilized the ratio of the volume to achieve a goal of accurate material feeding. Therefore, the semi-finished products having different colors and physical properties could be foamed evenly in the foaming mold, simultaneously. The colors of each of the semi-finished products would not dye another one of the semi-finished products. Therefore, the multicolor and multifunctional shoe material manufactured by the method has an aesthetic appearance and fulfills the required demand. By using the inventive concept, the multicolor shoe material having three or more colors could be produced as well, thereby enhancing a variety of color combinations. Additionally, since the materials in different colors could have different physical properties, the multicolor shoe material manufactured by the method could be multifunction on the required demand.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
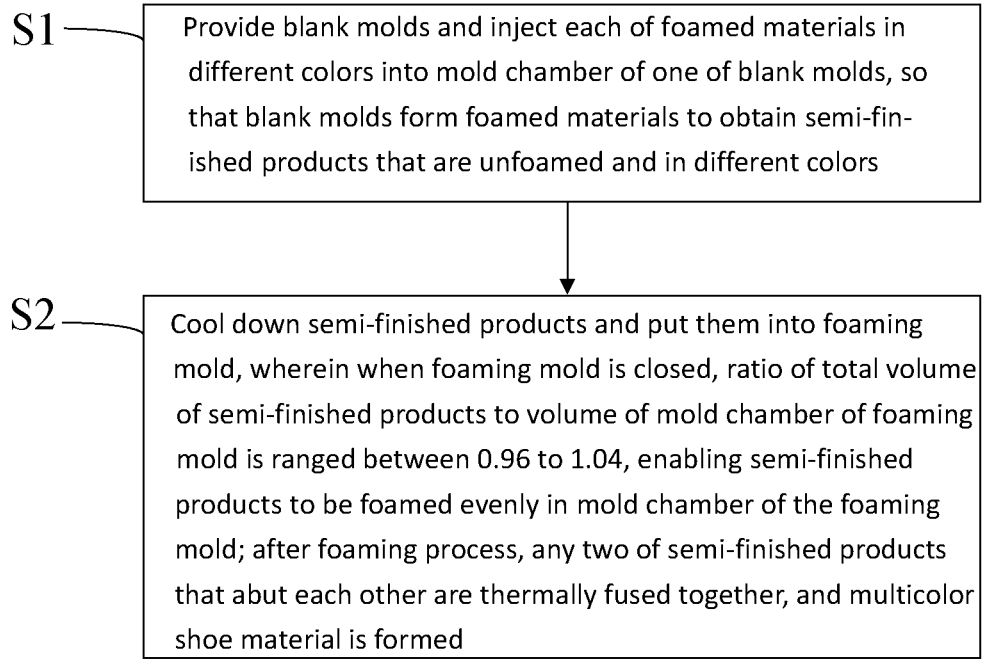
FIG. 1 is a flowchart, showing the method of manufacturing the multicolor shoe material of an embodiment according to the present invention.
Figure 2:
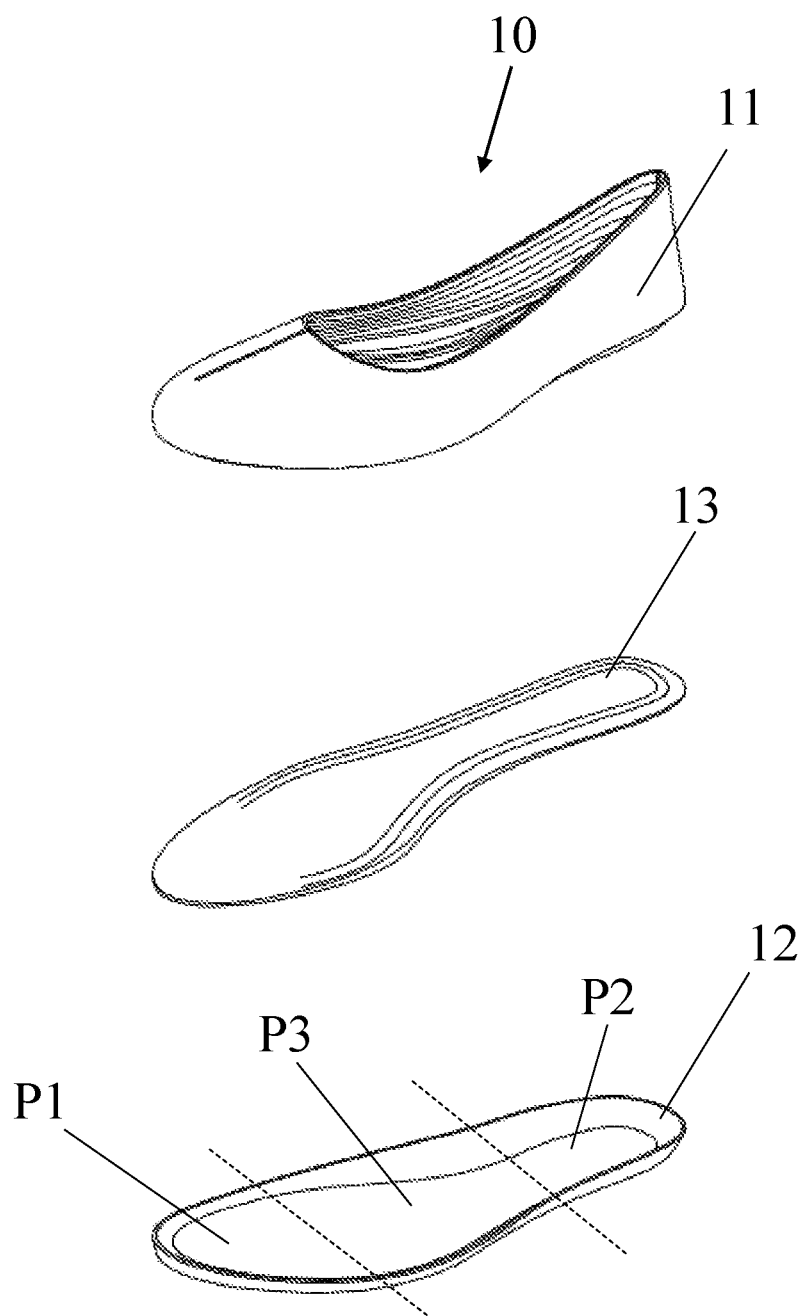
FIG. 2 is an exploded view of the semi-finished product of the multicolor shoe material of a first embodiment according to the present invention.
Figure 3:
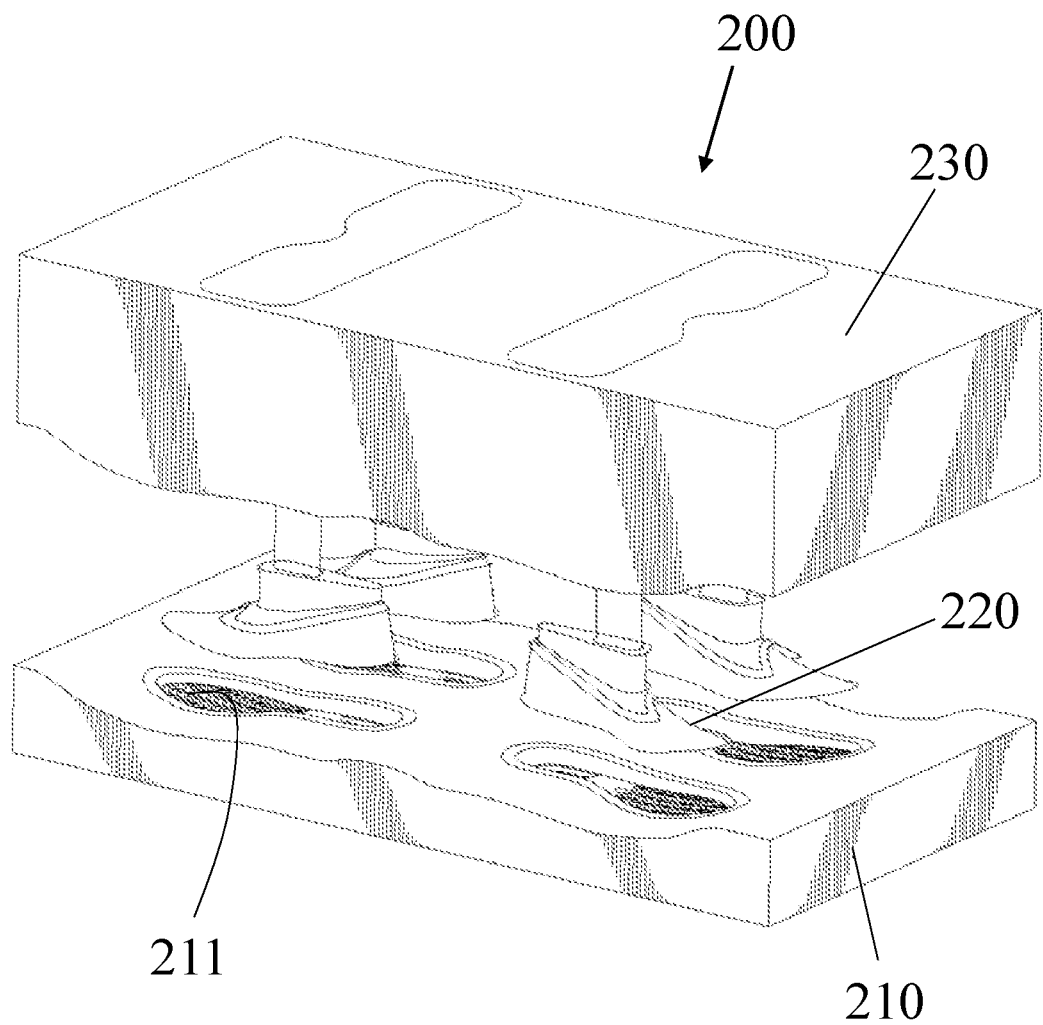
FIG. 3 is a perspective view of the foaming mold of the first embodiment according to the present invention.

A method of manufacturing a multicolor shoe material of an embodiment according to the present invention is illustrated in FIG. 1, including the following steps:

Step S1: a plurality of blank molds (not shown) are provided. Each of the different kinds of foaming material in different colors is injected into a cavity of one of the blank molds. When the foaming material in each of the blank molds is solidified, the foaming material could be demolded to form a semi-finished product 10 that is unfoamed. Therefore, the semi-finished products 10 (as shown in FIG. 2) in different colors and having different physical properties could be obtained by using the blank molds. More specifically, in the current embodiment, the foaming materials are selected from a group including ethylene-vinyl acetate (EVA), synthetic rubber, and thermoplastic elastomer (TPE). During the injecting process, each kind of the foaming material is injected under a condition that a screw temperature is lower than 130 Celsius degrees, wherein the screw temperature means a temperature of the screw in the injection molding machine. Since a foaming temperature of each kind of the foaming material excesses 140 Celsius degrees, the foaming materials are not foamed during the injecting process under a temperature lower than 130 Celsius degrees. Additionally, during the injecting process, each of the foaming materials could be evenly distributed in the cavity of one of the blank molds (not shown) to form the semi-finished product 10 by controlling a pressure of injection of the foaming material, wherein the semi-finished product 10 could be a shoe upper blank, a shoe sole blank, a shoe pad blank, an outsole pattern blank, and a shoe body blank. As illustrated in FIG. 2, in the first embodiment, the semi-finished product 10 is a shoe upper blank 11, a shoe sole blank 12, and a shoe pad blank 13 as examples.

In the current embodiment, the semi-finished products 10 are not foamed. The semi-finished products 10 could be made of the same foaming material having the same color and the same physical properties. Alternatively, each of the semi-finished products 10 could be made of different foaming materials having different colors and different physical properties. Difference between hardnesses of the semi-finished products 10 is lower than 40 degrees, wherein the hardness is measured by a Shore D durometer. In the present invention, the hardness of any object is measured the Shore D durometer. For example, the hardness of the shoe sole blank 12 is greater than the hardness of either the shoe upper blank 11 or the shoe pad blank 13, so that after the semi-finished products 10 are foamed to form a multicolor shoe product, the different parts of the shoe product have different functions, thereby enhancing the wearing comfort of a user and facilitating the stability during walking.

Next, a density distribution of each of the semi-finished products 10 is measured. The density detection of the current embodiment is exemplified by a density detection of the shoe sole blank 12. The shoe sole blank 12 is divided into a plurality of sections, including a front section P1, a rear section P2, and a middle section P3. The middle section P3 is located between the front section P1 and the rear section P2. A density of each of the sections (namely, the front section P1, the rear section P2, and the middle section P3) are measured, and a density difference between any two of the front section P1, the rear section P2, and the middle section P3 is in a range of 1 to 3%. In other words, the density of each of the sections of the shoe sole blank 12 produced by the step S1 is substantially the same as one another, so that a density distribution of the shoe sole blank 12 is even. Similarly, a density distribution of the shoe upper blank 11 and a density distribution of the shoe pad blank 13 are evenly distributed. In other embodiment, a number of the sections of the semi-finished products 10 could be adjusted on the required demand, as long as the densities of different portions of the semi-finished products 10 could be measured.

In the step S1 of the method of manufacturing the multicolor shoe material of the current embodiment, each kind of the foaming material is injected under a condition that the screw temperature is lower than 130 Celsius degrees. In a conventional injecting technology, a temperature of injection is higher than 160 Celsius degrees, so that the method of the current embodiment could reduce the consumption of the energy, thereby attaining energy conservation and carbon reduction. During the injecting process, each of the foaming materials could be evenly distributed in the cavity of one of the blank molds (not shown) by controlling a pressure of injection of the foaming material, so that the foaming material in each of the blank molds is solidified to form the semi-finished product 10 having uniform density.

Figure 4:
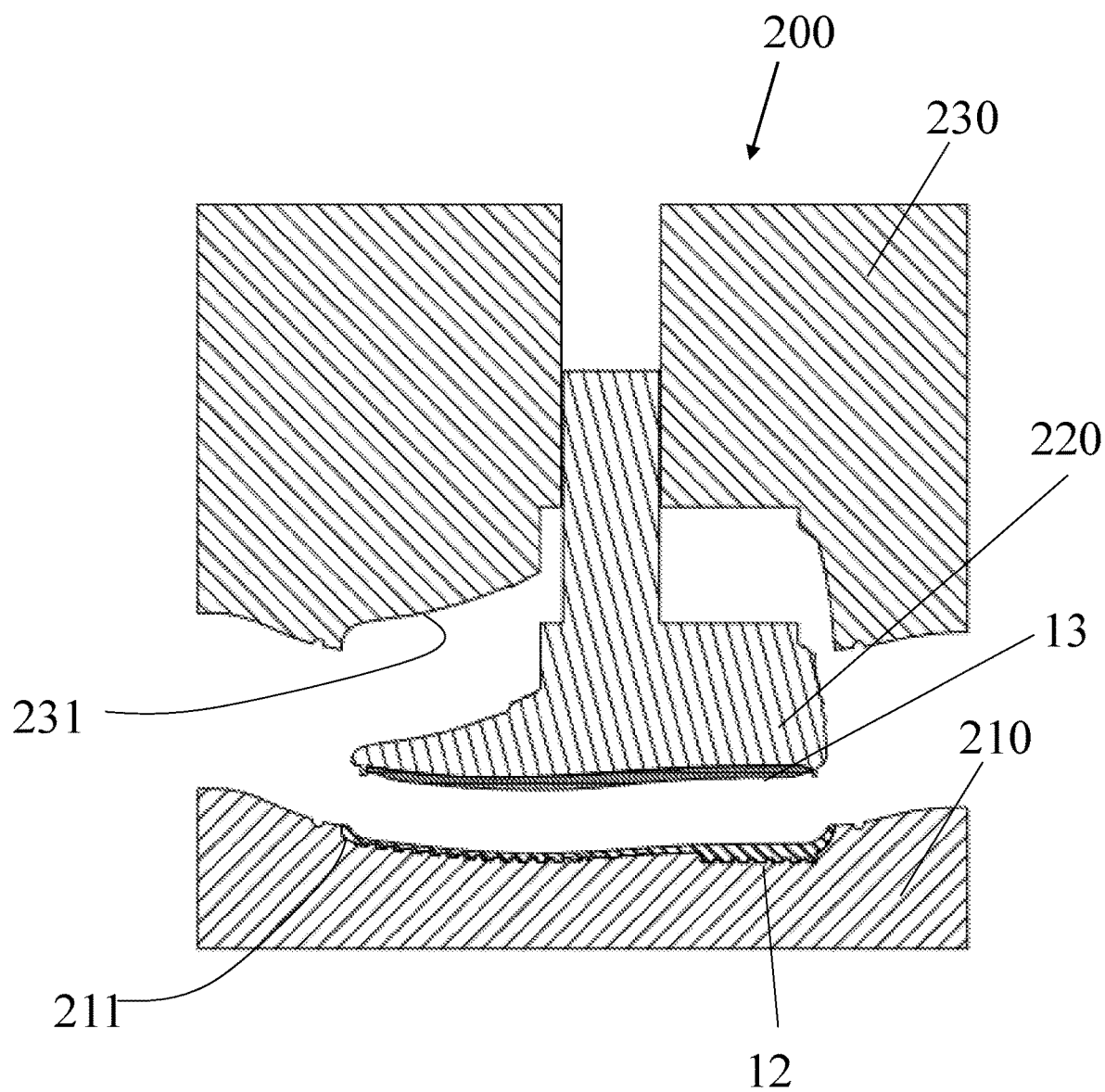
FIG. 4 is a sectional schematic view, showing the shoe sole blank of the first embodiment according to the present invention is put into the lower mold.
Figure 5:
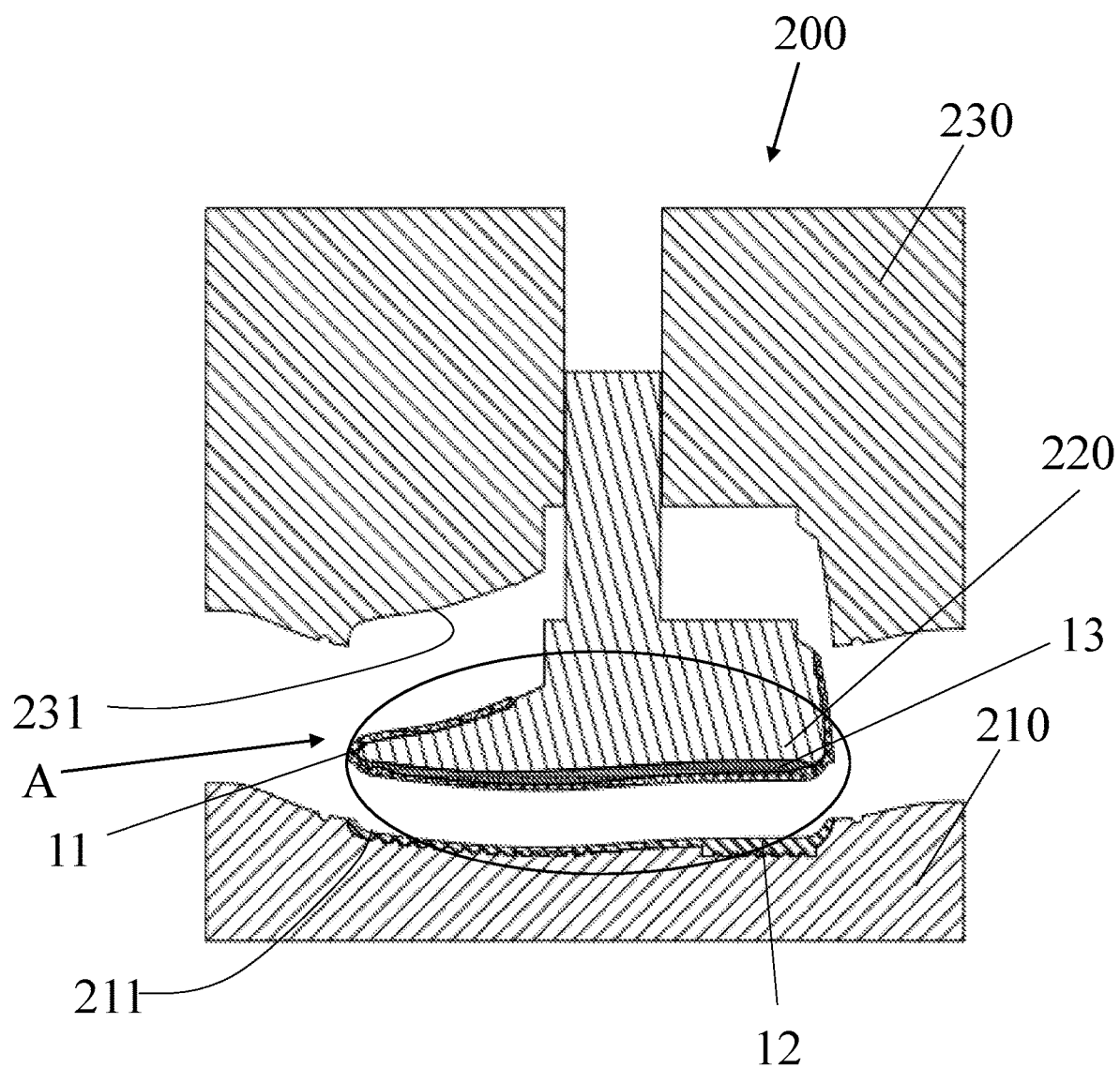
FIG. 5 is similar to FIG. 4, showing the shoe upper blank is disposed on the internal core.
Figure 6:
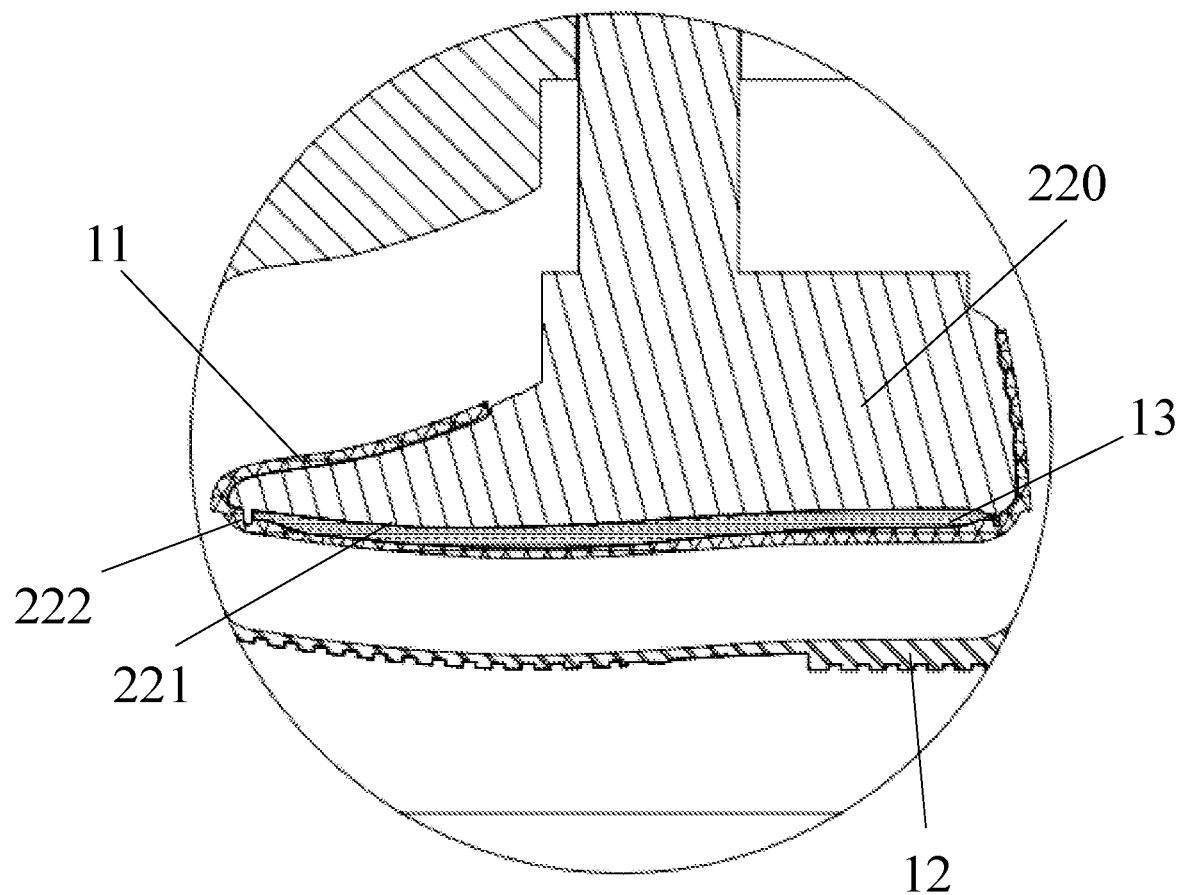
FIG. 6 is an enlarged partial view of a marked region A in FIG. 5.

Step S2: the semi-finished product 10 is cooled down. When the semi-finished product 10 is cooled, the semi-finished product 10 is put into a foaming mold 200. As illustrated in FIG. 3 to FIG. 6, the shoe sole blank 12 is put into a lower mold 210 of the foaming mold 200, and the shoe pad blank 13 is disposed on an internal core 220 of the foaming mold 200. The internal core 220 has a receiving groove 221 at a bottom surface, and the shoe pad blank 13 is disposed in the receiving groove 221. The receiving groove 221 has a protrusion 222 for separating the foaming materials in different colors surrounds a periphery of the shoe pad blank 13. As illustrated in FIG. 4 to FIG. 6, the shoe upper blank 11 fits around the internal core 220, so that the shoe pad blank 13 is located at an inner side of the shoe upper blank 11. The protrusion 222 is received by a groove 111 located at the inner side of the shoe upper blank 11 to prevent the periphery of the shoe pad blank 13 from contacting with the shoe upper blank 11.

A ratio of the density of one of the semi-finished products 10 to that of another of the semi-finished products 10 is arranged between 1 and 1.2. It is worthy to mention that since the color of each of the semi-finished products 10 could affect a shrinkage rate of a volume of the semi-finished product 10 during a cooling process. For example, a semi-finished product in a dark color is easy to absorb heat, so that a shrinkage rate of a volume of the semi-finished product in the dark color is high during the cooling process. On the contrary, a semi-finished product in a light color is hard to absorb heat, so that a shrinkage rate of a volume of the semi-finished product in the light color is low during the cooling process. Therefore, when the volume of the semi-finished product in the light color is equal to the volume of the semi-finished product in the dark color, a density of the semi-finished product in the dark color is higher than that of the semi-finished product in the light color.

Figure 7:
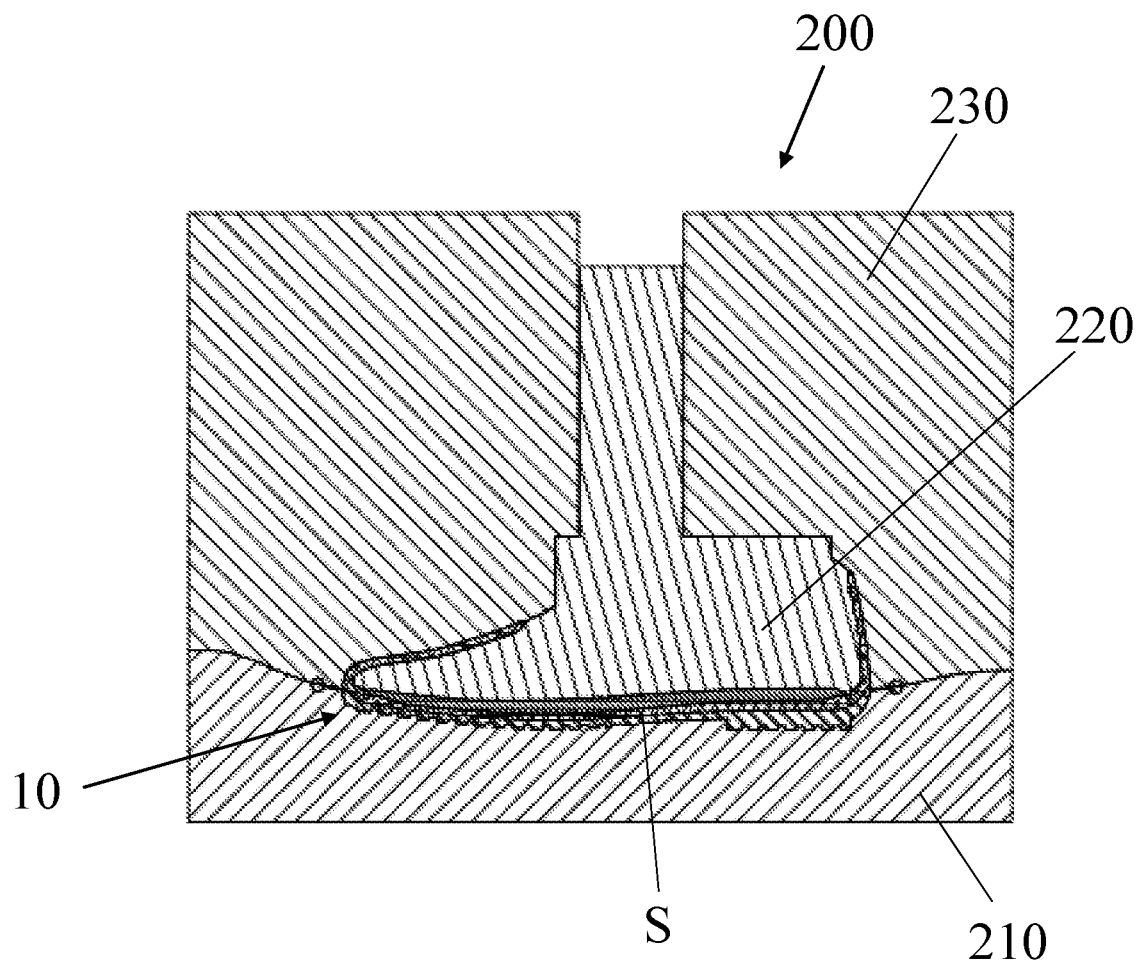
FIG. 7 is similar to FIG. 5, showing the foaming mold of the first embodiment is closed.
Figure 8:
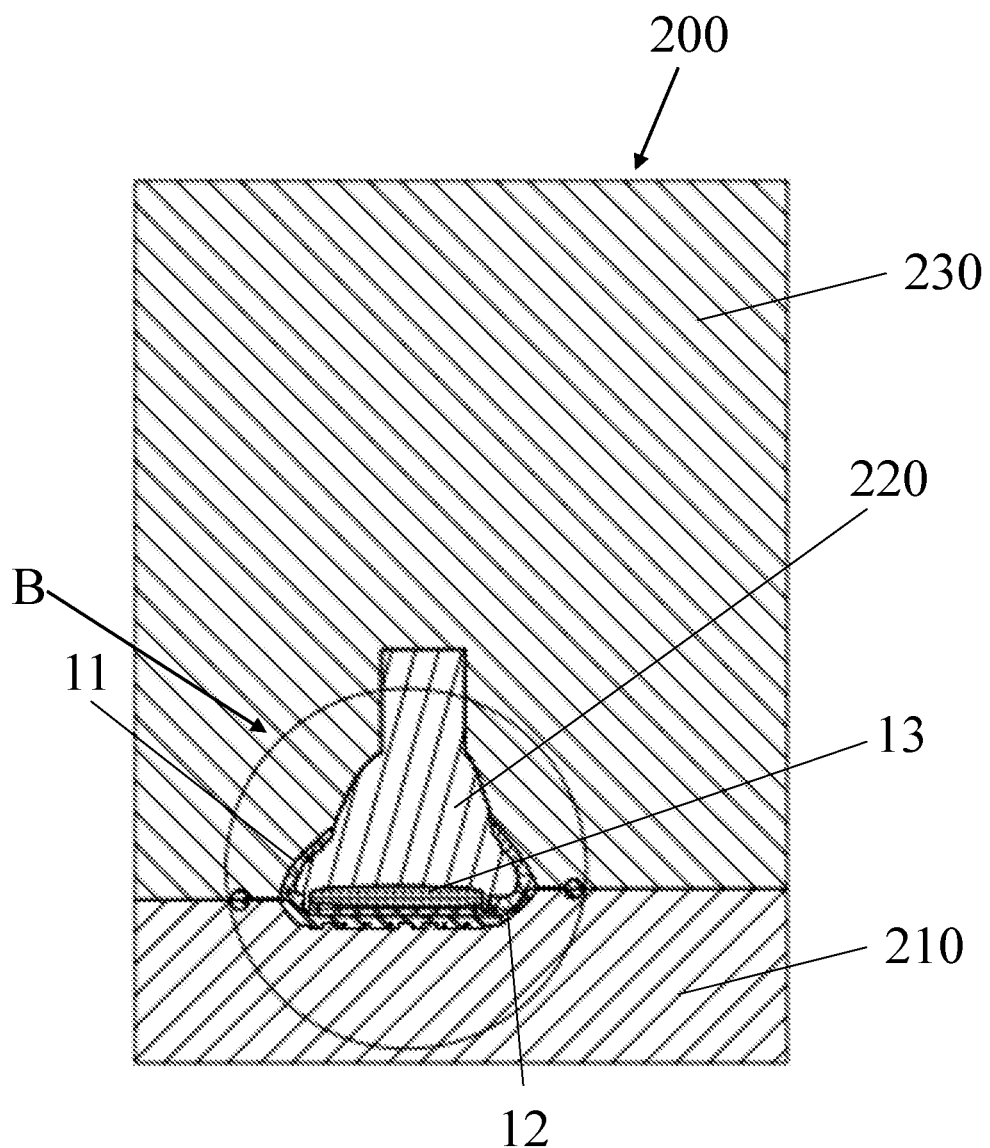
FIG. 8 is a sectional schematic view of the foaming mold shown in FIG. 7, which is taken from another perspective.
Figure 9:
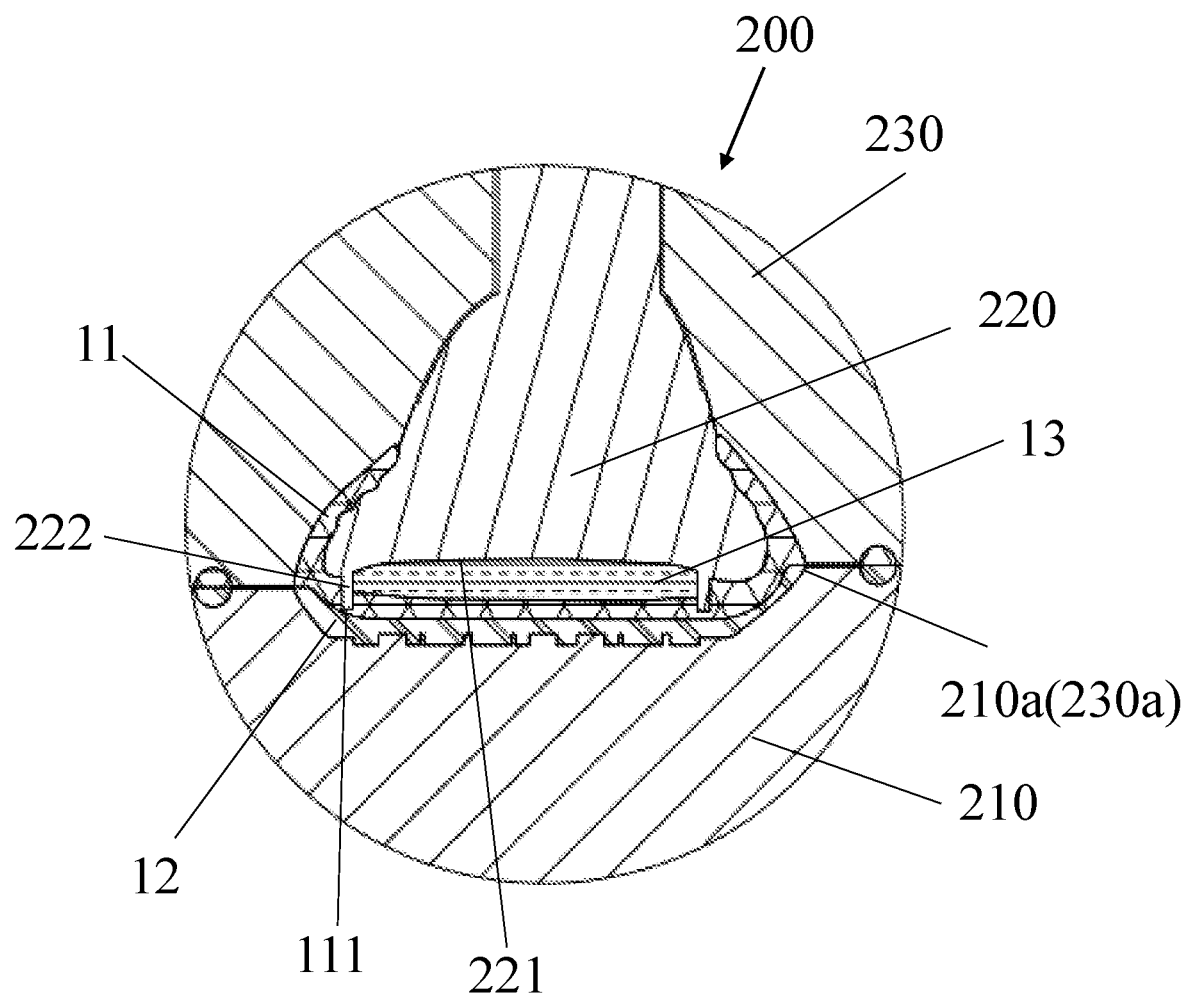
FIG. 9 is an enlarged partial view of a marked region B in FIG. 8.

As illustrated in FIG. 7, while the foaming mold 200 is closing, an upper mold 230 of the foaming mold 200 drives the internal core 220 to move in a direction toward the lower mold 210 until the mold is closed. The upper mold 230 is moved toward the lower mold 210 at a speed slower than 10 cm/s, so that a surface of the shoe sole blank 12 is preheated and softened in the cavity 211 of the lower mold 210. When the upper mold 230 and the lower mold 210 are closed, a peripheral surface of the shoe upper blank 11 contacts with an inner wall of the cavity 231 of the upper mold 230. A bottom surface of the shoe upper blank 11 contacts with the shoe sole blank 12. Thus, the shoe upper blank 11 and the shoe sole blank 12 fill a mold chamber S formed between the internal core 220, the upper mold 230, and the lower mold 210.

In the current embodiment, when the upper mold 230 and the lower mold 210 are closed, a gap between a cavity opening 230a of the upper mold 230 and a cavity opening 210a of the lower mold 210 is in a range of 0.01 mm to 0.05 mm. Therefore, while the shoe upper blank 11 and the shoe sole blank 12 are foaming, the foaming materials do not overflow. A ratio of a total volume of the shoe upper blank 11, the shoe sole blank 12 and the shoe pad blank 13 to a volume of the mold chamber S of the foaming mold 200 is ranged between 0.96 to 1.04. In a preferred embodiment, the ratio could be ranged between 1 and 1.02, so that the semi-finished product 10 could evenly foamed in the mold chamber S of the foaming mold 200. A foaming temperature of the foaming mold 200 ranges between 160 and 200 Celsius degrees, so that adjacent two of the semi-finished products 10 could be connected to each other by heat fusion. According to the present invention, since the ratio of the total volume of the semi-finished products 10 to the volume of the mold chamber S of the foaming mold 200 is restricted between 0.96 and 1.04, by simply putting the semi-finished products 10 into the foaming mold 200, the foaming mold 200 could be precisely fed with the foaming material. Therefore, the semi-finished products 10 in different colors with different physical properties could be evenly foamed in the foaming mold 200, and the colors of the semi-finished products 10 do not die one another, thereby preventing defects of the foamed shoe material and reducing the waste.

Figure 10:
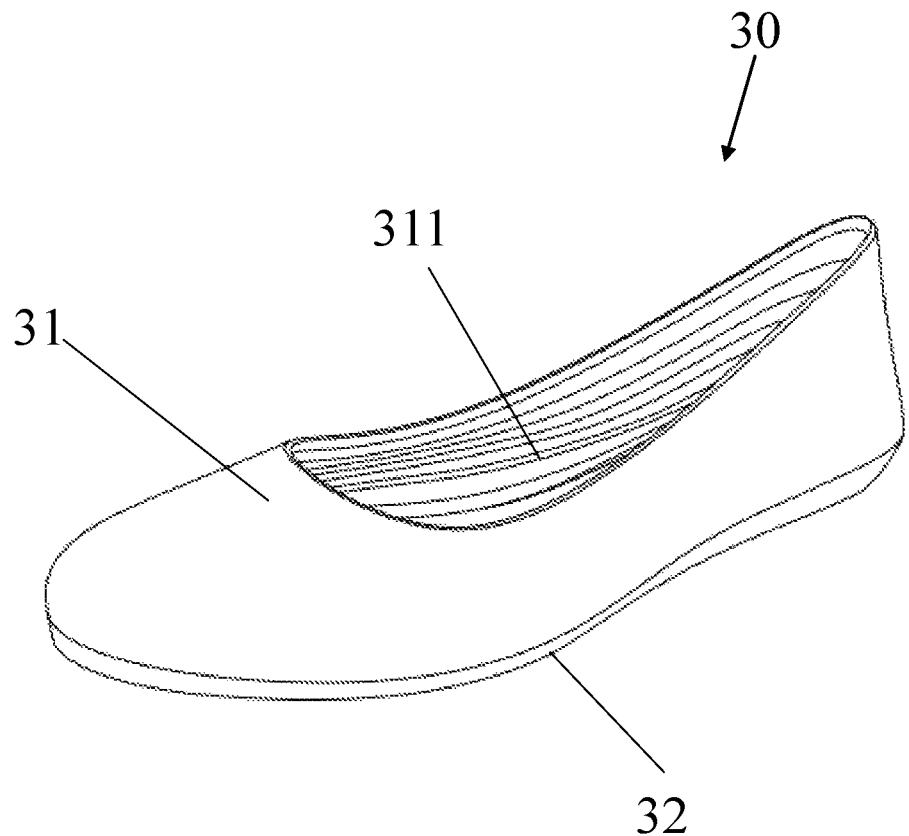
FIG. 10 is a perspective view of the multicolor shoe material of the first embodiment according to the present invention.

Additionally, during the foaming process, the protrusion 222 could prevent the periphery of the shoe pad blank 13 from being in touch with the shoe upper blank 11, so that an appearance of the foamed shoe pad and the foamed shoe upper has a clear boundary. In other words, the color of the shoe upper blank 11 does not invade into the shoe pad blank 13 from the periphery of the shoe pad blank 13. Therefore, after the semi-finished products 10 are completely foamed and formed, a multicolor shoe material 30 (as shown in FIG. 10) could be obtained, wherein the multicolor shoe material 30 has three different colors. The hardnesses, the materials, and the densities of three different portions of the multicolor shoe material 30 are various.

Figure 11:
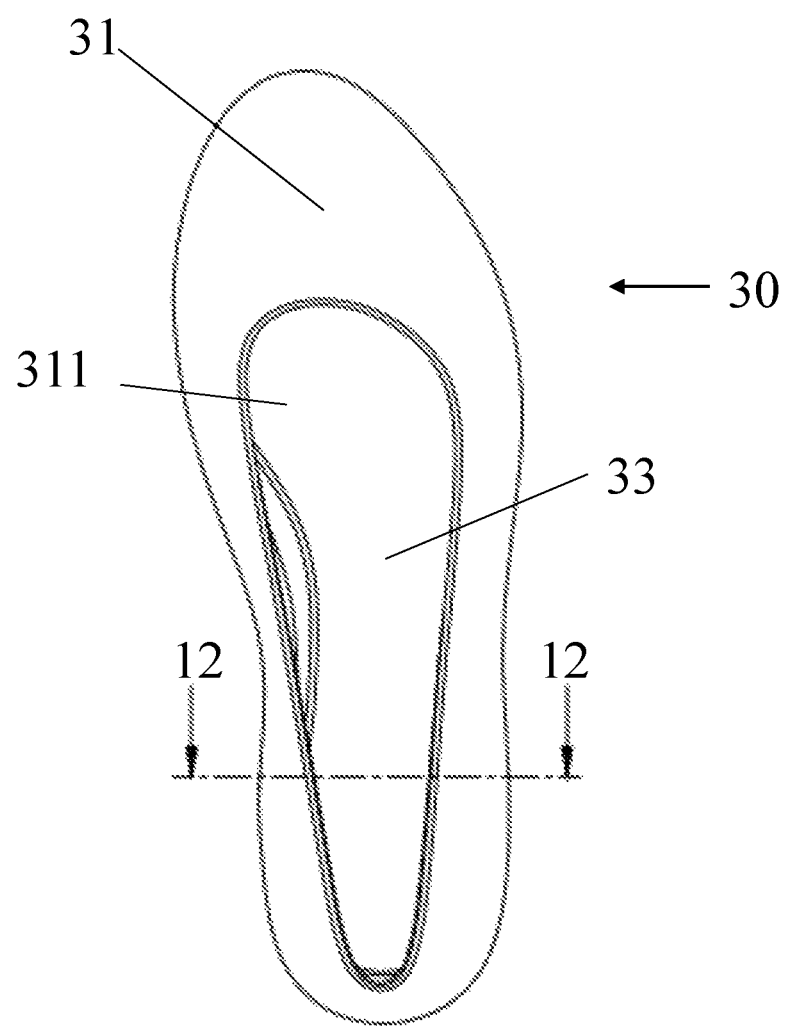
FIG. 11 is a top view of the multicolor shoe material of the first embodiment according to the present invention.
Figure 12:
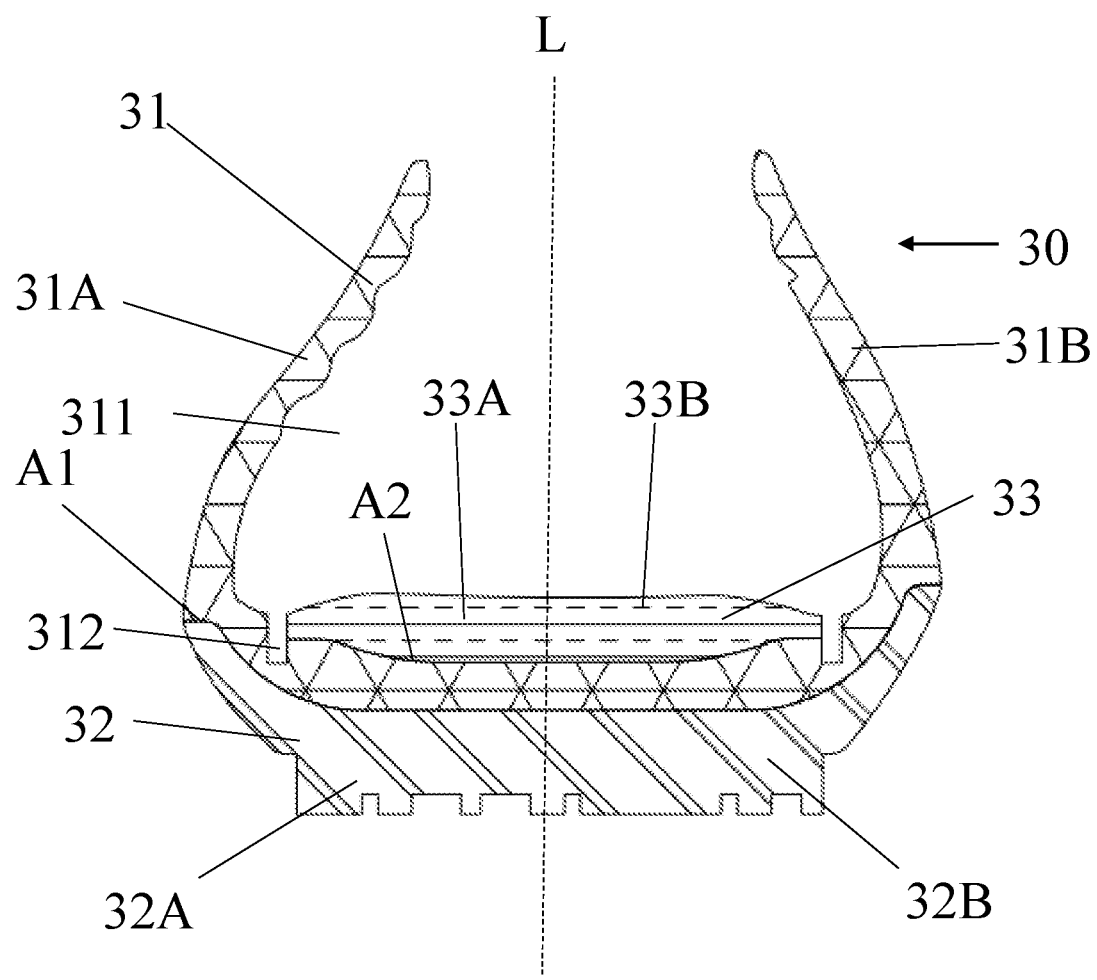
FIG. 12 is a sectional view taken along the 12-12 line in FIG. 11.

As illustrated in FIG. 10 to FIG. 12, the multicolor shoe material 30 is formed by foaming several unfoamed semi-finished products 10 in different colors. As illustrated in FIG. 10, the multicolor shoe material 30 is a flat shoe as an example. The multicolor shoe material 30 includes a first foamed color body 31 and a second foamed color body 32. In the current embodiment, the first foamed color body 31 is a shoe upper of the multicolor shoe material 30, and the second foamed color body 32 is a shoe sole of the multicolor shoe material 30, wherein the first foamed color body 31 and the second foamed color body 32 are thermally fused with each other. In the current embodiment, a density distribution of the multicolor shoe material 30 is measured. The multicolor shoe material 30 is defined to have a parting line L, wherein the first foamed color body 31 is divided into a first section 31A and a second section 31B by the parting line L, and the second foamed color body 32 is divided into a third section 32A and a fourth section 32B by the parting line L. A density difference between the first section 31A and the second section 31B is in a range of 1% to 3%. A density difference between the third section 32A and the fourth section 32A is in a range of 1% to 3%. Therefore, the density distribution of the first foamed color body 31 and the density distribution of the second foamed color body 32 of the multicolor shoe material 30 are even. Additionally, the multicolor shoe material 30 is defined to have a first plane A1, wherein the first plane A1 is an adhesive interface between the first foamed color body 31 and the second foamed color body 32, so that a color of the first foamed color body 31 and a color of the second foamed color body 32 are presented at two sides of the first plane A1, respectively. From an appearance of the multicolor shoe material 30, it is obvious to observe that the first foamed color body 31 and the second foamed color body 32 present different colors, respectively. The color of the first foamed color body 31 does not invade into the second foamed color body 32, and vice versa. In an preferred embodiment, a difference between a hardness of the first foamed color body 31 and a hardness of the second foamed color body 32 is lower than 40 degrees, wherein the hardness of the second foamed color body 32 is greater than the first foamed color body 31. Thus, the texture of the shoe upper could remain flexible and soft, and the texture of the shoe sole could remain hard, durable, and anti-slip, thereby enhancing wearing comfort and walking stability.

As illustrated in FIG. 11 and FIG. 12, the multicolor shoe material 30 includes a third foamed color body 33, wherein the third foamed color body 33 and the first foamed color body 31 are thermally fused. In the first embodiment, the third foamed color body 33 is a shoe pad of the multicolor shoe material 30, wherein the first foamed color body 31 has a space F for receiving a foot, and the third foamed color body 33 is located in the space F for receiving a foot. A density distribution of the third foamed color body 33 is measured as well. The third foamed color body 33 is divided into a fifth section 33A and a sixth section 33B by the parting line L. A density difference between the fifth section 33A and the sixth section 33B is in a range of 1% to 3%. In other words, a density distribution of the third foamed color body 33 is even. Additionally, the multicolor shoe material 30 is defined to have a second plane A2, wherein the second plane A2 is an adhesive interface between the first foamed color body 31 and the third foamed color body 33. An internal side of the first foamed color body 31 has a groove 312 corresponding to a position of the shoe pad, wherein the groove 312 corresponds to the groove 111 of the shoe upper blank 11. The groove 312 is located in the space F for receiving a foot and surrounds a periphery of the third foamed color body 33, so that a circumference of the third foamed color body 33 is not in touch with the first foamed color body 31, thereby avoiding a color of the first foamed color body 31 to invade into the third foamed color body 33, and vice versa. Besides, from a perspective of FIG. 10, the first foamed color body 31 and the third foamed color body 33 are presented in different colors at two sides of the second plane A2. The color of the first foamed color body 31 does not invade into the third foamed color body 33, and the color of the third foamed color body 33 does not invade into the first foamed color body 31. Thus, the multicolor shoe material 30 could present three different colors, and a boundary between any two of the three different colors is clear, thereby enhancing the aesthetic appearance of the multicolor shoe material 30. In a preferred embodiment, a difference between a hardness of the third foamed color body 33 and the hardness of the first foamed color body 31 is lower than 40 degrees. The hardness of the first foamed color body 31 is greater than the hardness of the third foamed color body 33, so that the user could feel more comfortable when wearing the multicolor shoe material 30.

Figure 13:
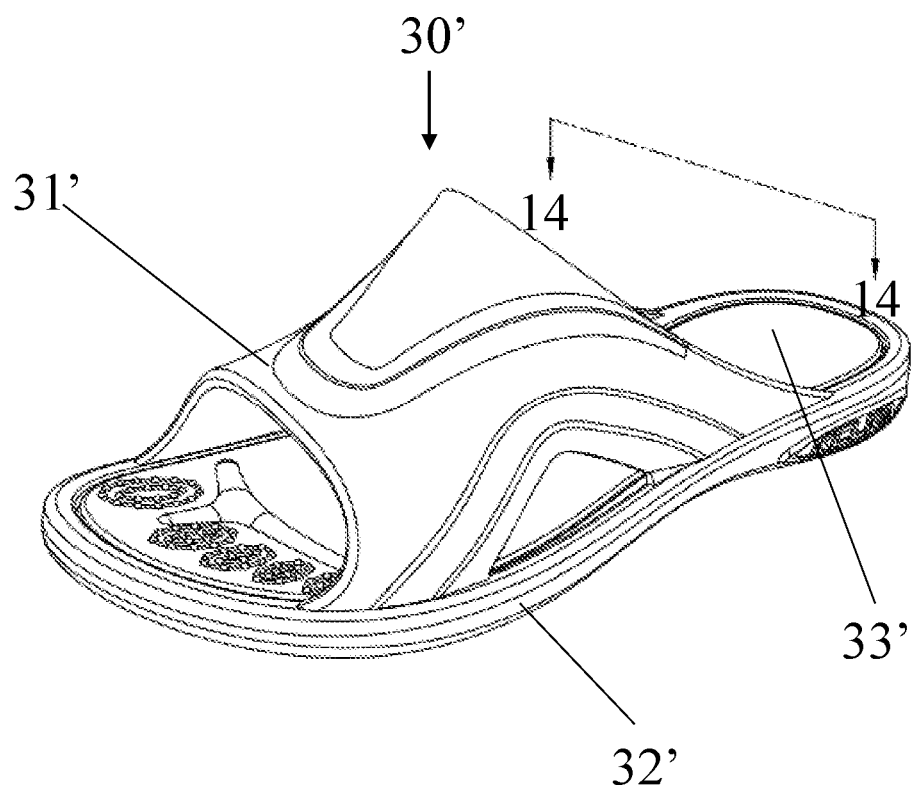
FIG. 13 is a perspective view of the multicolor shoe material of a second embodiment according to the present invention.
Figure 14:
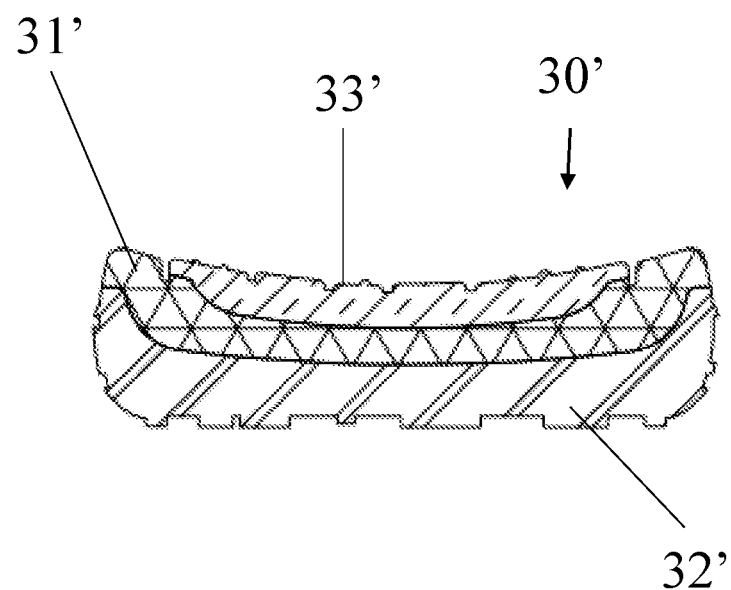
FIG. 14 is a sectional view taken along the 14-14 line in FIG. 13.
Figure 15:
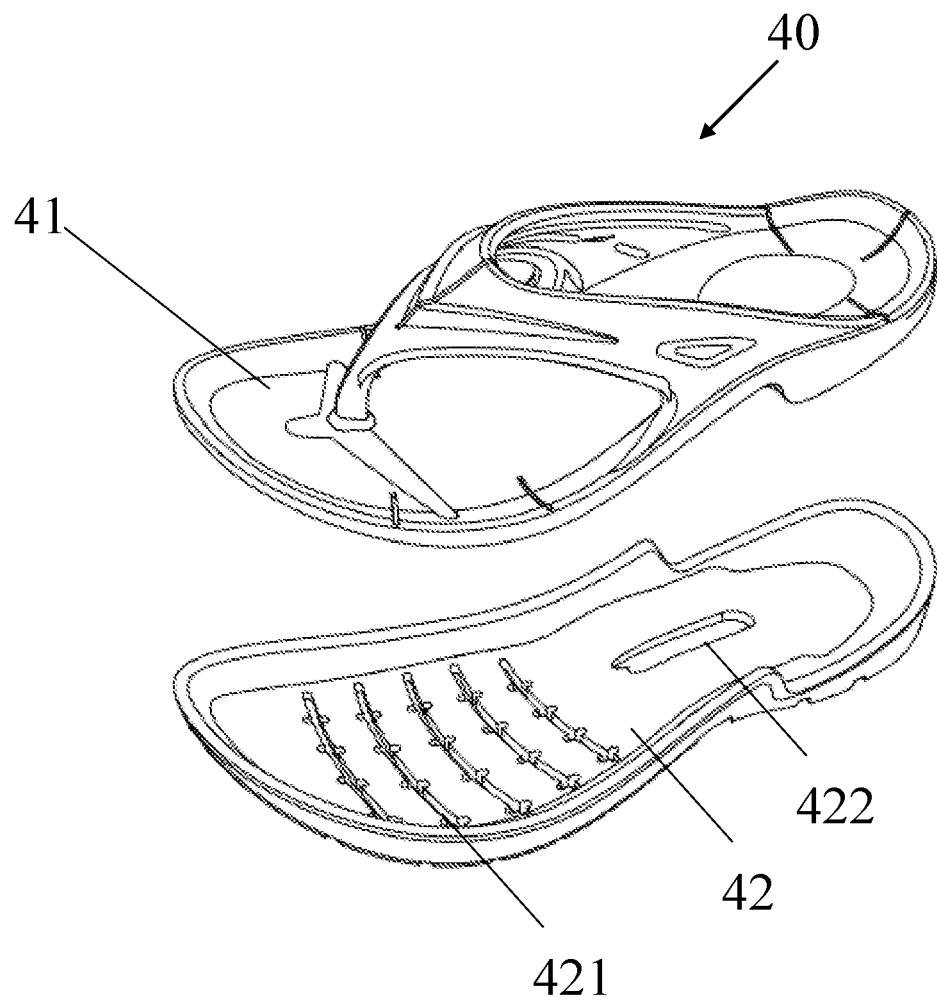
FIG. 15 is an exploded view of the semi-finished product of the multicolor shoe material of a third embodiment according to the present invention.
Figure 16:
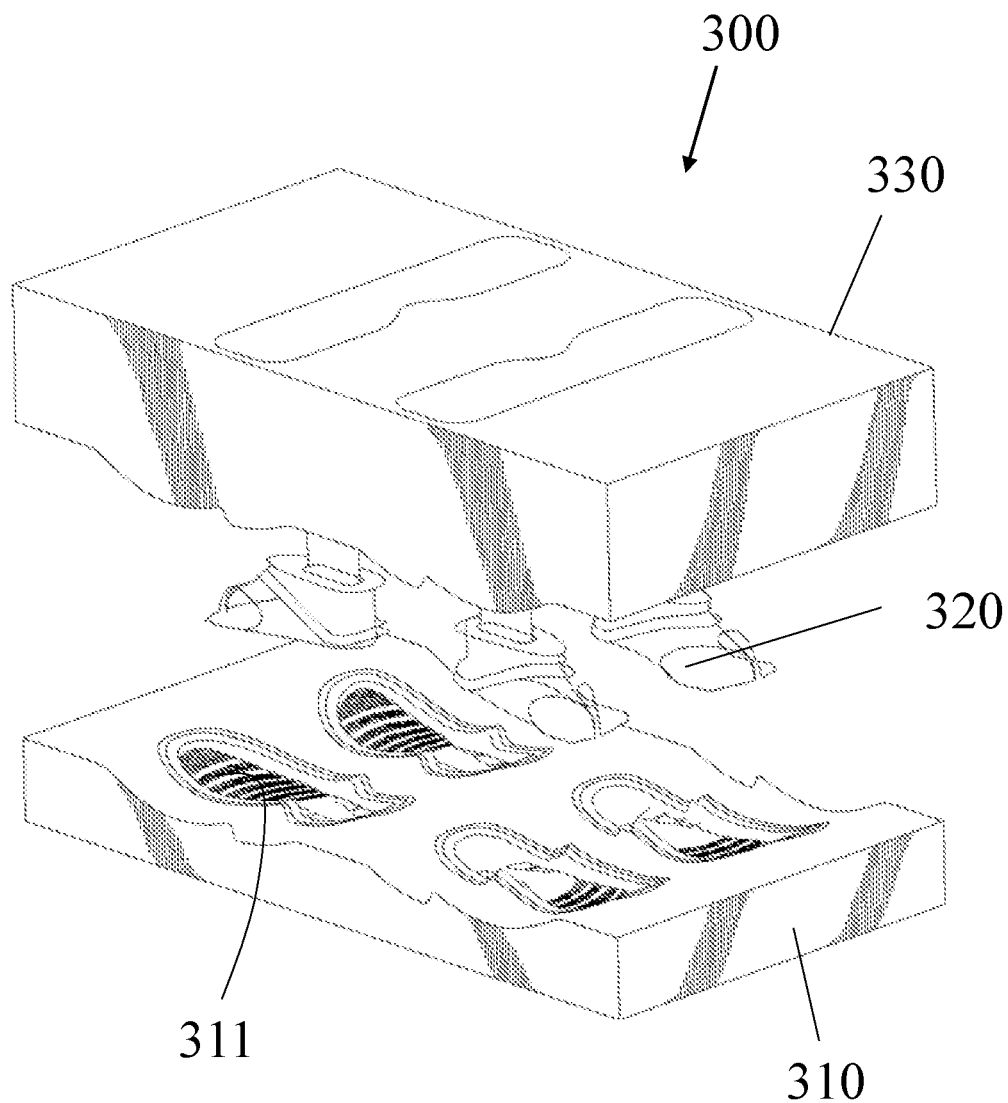
FIG. 16 is a perspective view of the foaming mold of the third embodiment according to the present invention.
Figure 17:
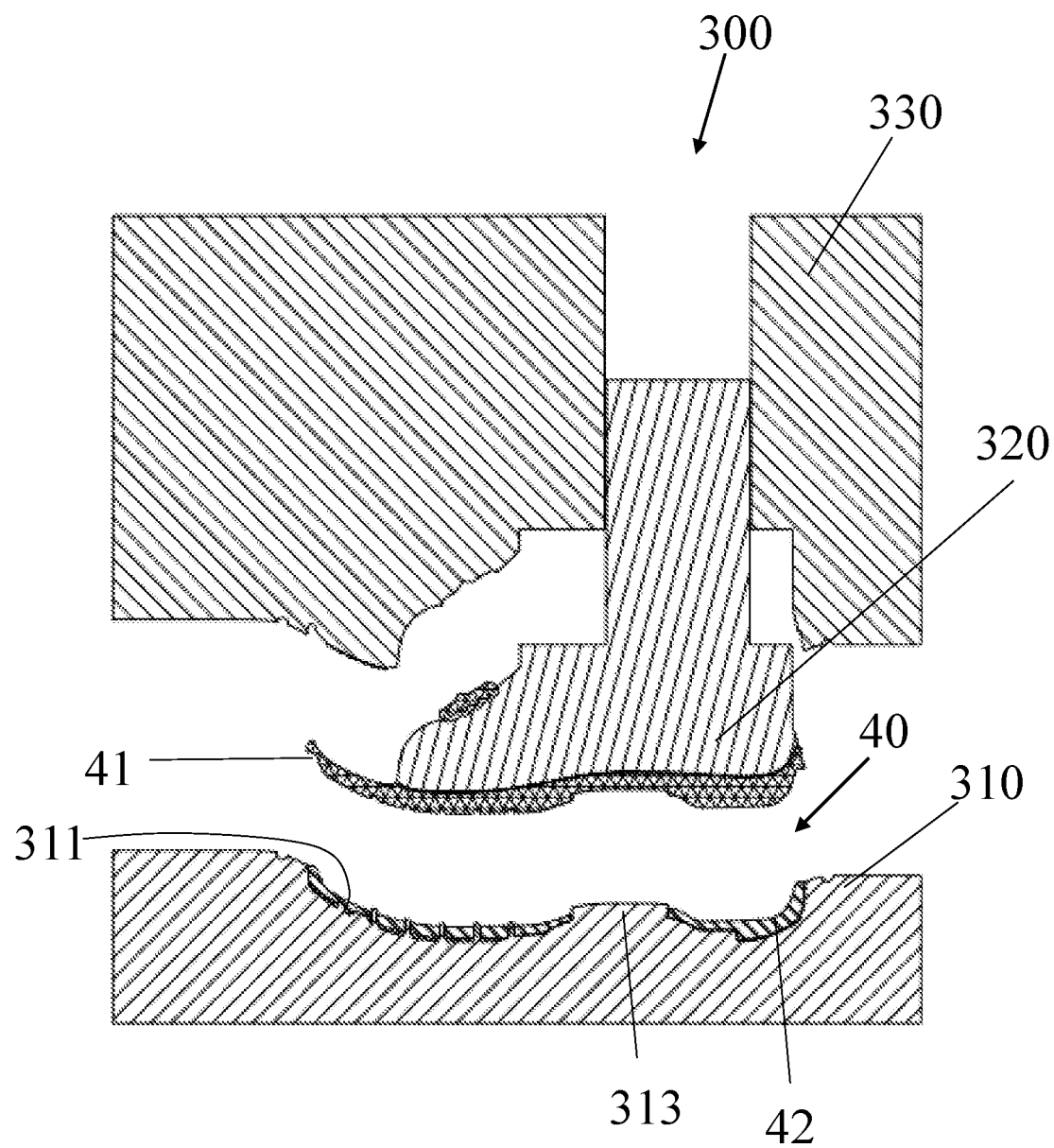
FIG. 17 is a sectional schematic view, showing the semi-finished product of the multicolor shoe material is put into the foaming mold of the third embodiment according to the present invention.

As illustrated in FIG. 13 and FIG. 14, another multicolor shoe material 30' of a second embodiment according to the present invention, wherein a method of manufacturing the multicolor shoe material 30' is as same as that of the first embodiment. The difference between the multicolor shoe material 30' of the second embodiment and the multicolor shoe material 30 of the first embodiment is that the multicolor shoe material 30' is a slipper having three colors.

As illustrated in FIG. 13 and FIG. 14, the multicolor shoe material 30' includes a first foamed color body 31', a second foamed color body 32', and a third foamed color body 33'. The first foamed color body 31' is a shoe upper of the multicolor shoe material 30'. The second foamed color body 32' is a shoe sole of the multicolor shoe material 30'. The third foamed color body 33' is a shoe pad of the multicolor shoe material 30'. The first foamed color body 31', the second foamed color body 32', and the third foamed color body 33' are in different colors and have different physical properties, including the hardness and the density, could be adjusted on the required demand. A material of each of the foamed color bodies 31', 32', 33' is adjustable on required demand. Therefore, the multicolor shoe material 30' could not only be presented in various colors, but also have various functions and physical properties in different portions.

As illustrated in FIG. 15 to FIG. 22, a semi-finished product 40 and a multicolor shoe material 50 of a third embodiment according to the present invention, wherein the multicolor shoe material 50 of the third embodiment is a slipper having two colors. The multicolor shoe material 50 is formed by foaming two semi-finished products 40, wherein the semi-finished products 40 includes the shoe upper blank 41 and the shoe sole blank 42. The shoe upper blank 41 and the shoe sole blank 42 are in different colors. Specifically, the shoe sole blank 42 has a plurality of first slots 421 and a second slot 422. The first slots 421 are arranged along a longitudinal direction of the shoe sole blank 42, and the second slot 422 extends along the longitudinal direction of the shoe sole blank 42. The first slots 421 and the second slot 422 penetrate from a top surface of the shoe sole blank 42 to a bottom surface of the shoe sole blank 42.

As illustrated in FIG. 16 to FIG. 19, the shoe upper blank 41 and the shoe sole blank 42 are put into a foaming mold 300. The foaming mold 300 includes a lower mold 310, an internal core 320, and an upper mold 330, wherein the internal core 320 is connected to the upper mold 330 and is located between the lower mold 310 and the upper mold 330. During a manufacturing process, the shoe sole blank 42 is put into the lower mold 310 first, a cavity 311 of the lower mold 310 has a plurality of positioning blocks 313 correspondingly engaging with the first slots 421 and the second slot 422 on the shoe sole blank 42. The shoe upper blank 41 fits around the internal core 320. In the other embodiment, a number of the slot on the shoe sole blank 42 is at least one, and a number of the positioning blocks 313 is at least one corresponding to the slot.

Figure 18:
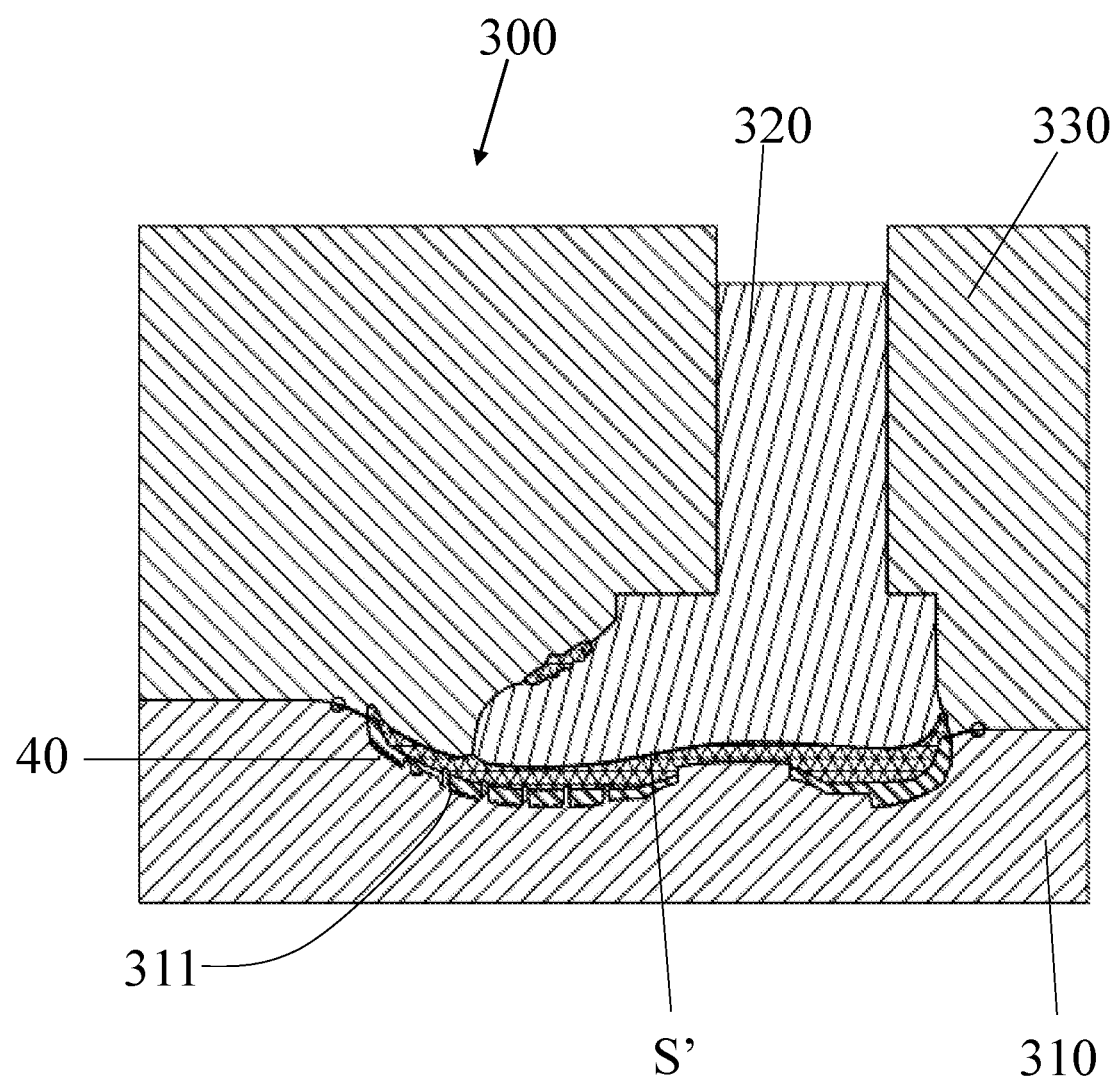
FIG. 18 is similar to FIG. 17, showing the foaming mold of the third embodiment is closed.
Figure 19:
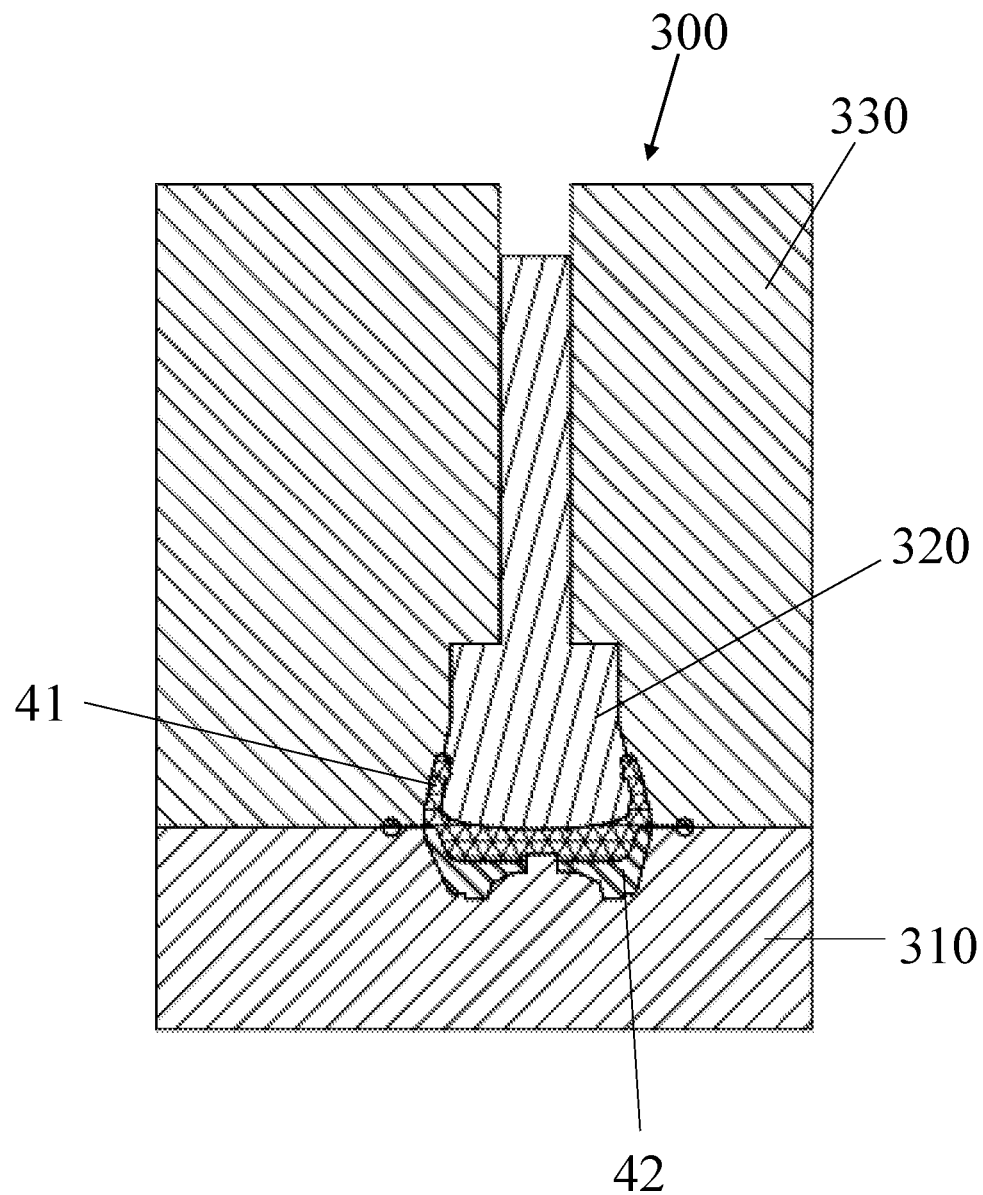
FIG. 19 is a sectional schematic view of the foaming mold shown in FIG. 18, which is taken from another perspective.

As illustrated in FIG. 18, when the upper mold 330 and the lower mold 310 are closed, the shoe upper blank 41 is in touch with the shoe sole blank 42. A ratio of a total volume of the shoe upper blank 41 and the shoe sole blank 42 to a volume of the mold chamber S' of the foaming mold 300 is in a range of 0.96 to 1.04. In a preferred embodiment, the ratio could range between 1 and 1.02, so that the semi-finished products 40 could be evenly foamed in the mold chamber S' of the foaming mold 300. With such design, the foaming mold 300 could be precisely fed with the semi-finished products 40, so that the semi-finished products 40 in different colors could be evenly foamed in the foaming mold 300, and the colors of the semi-finished products 40 do not invade into one another, thereby reducing the defective products.

Figure 20:
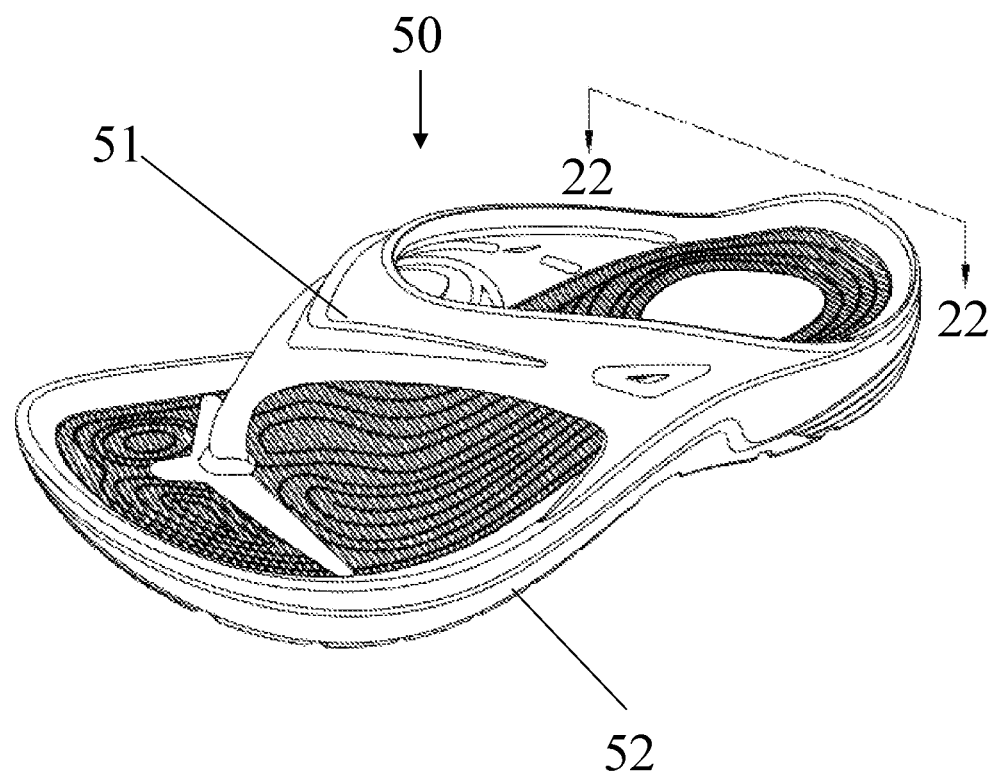
FIG. 20 is a perspective view of the multicolor shoe material of the third embodiment according to the present invention.
Figure 21:
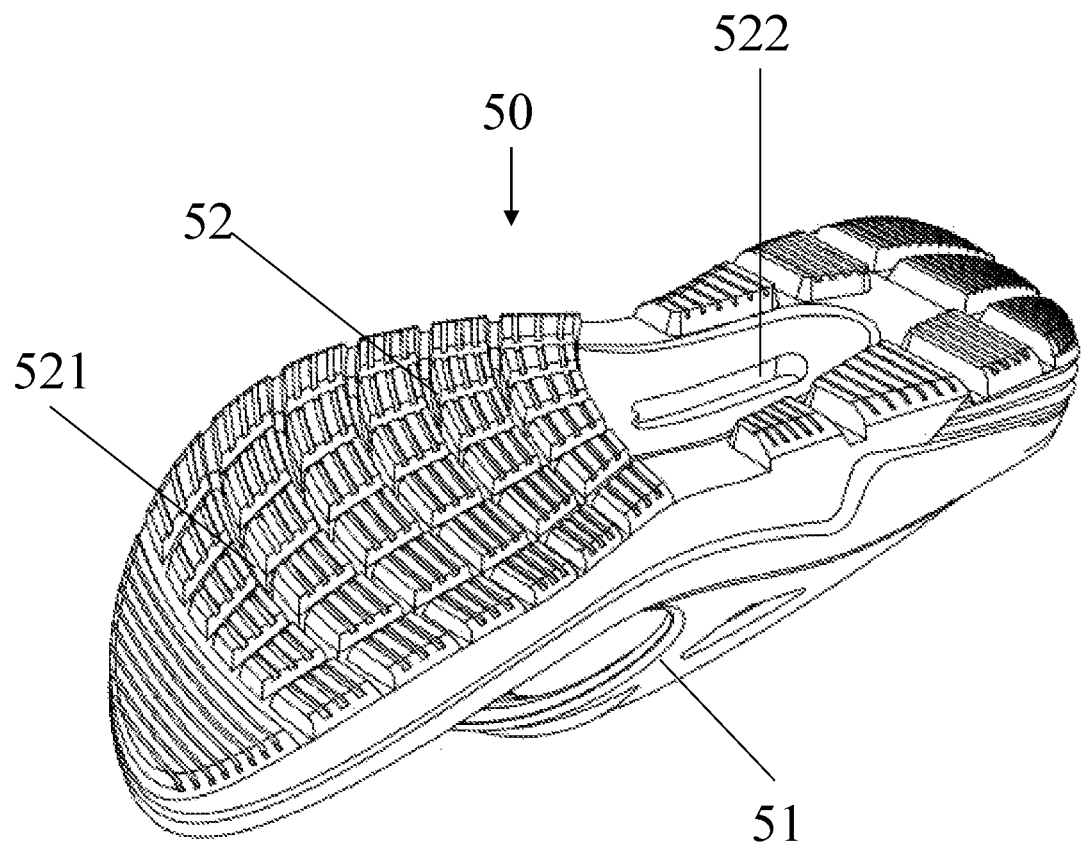
FIG. 21 is a perspective view of the multicolor shoe material of the third embodiment seen from another perspective.
Figure 22:
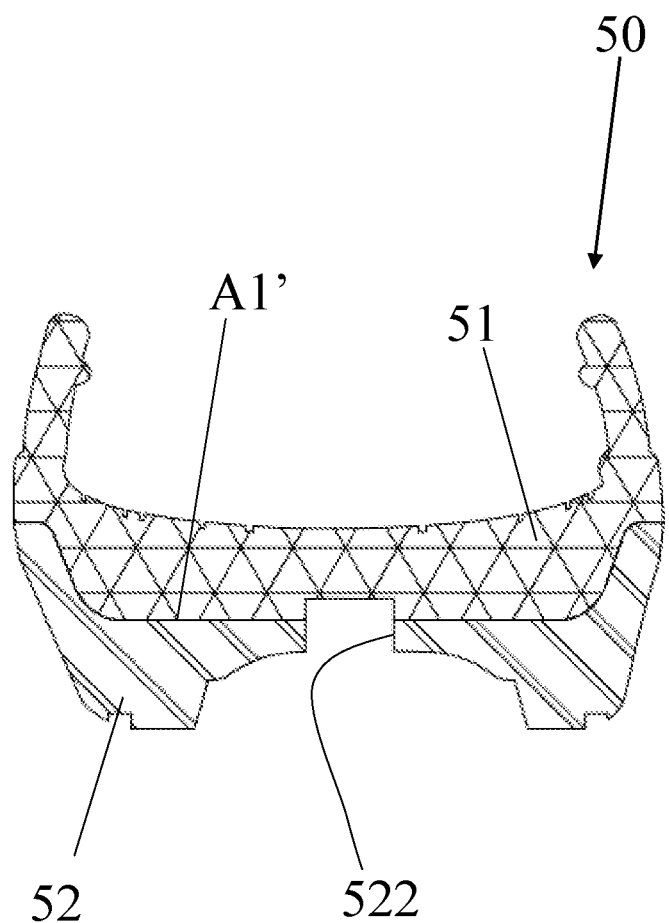
FIG. 22 is a sectional view taken along the 22-22 line in FIG. 20.

When the foaming mold 300 is demolded, a multicolor shoe material 50 that is completely foamed could be obtained, as shown in FIG. 20. The multicolor shoe material 50 is the slipper having two colors and having various hardnesses and densities in different parts of the multicolor shoe material 50. As illustrated in FIG. 20 to FIG. 22, the multicolor shoe material 50 includes a first foamed color body 51 and a second foamed color body 52. In the third embodiment, the first foamed color body 51 is a shoe upper of the multicolor shoe material 50, and the second foamed color body 52 is a shoe sole of the multicolor shoe material 50. The first foamed color body 51 and the second foamed color body 52 are thermally fused. Since the shoe sole blank 42 has the first slots 421 and the second slot 422, a plurality of first holes 521 and a second hole 522 are formed on the second foamed color body 52 corresponding to the slots on the shoe sole blank 42. Therefore, when the second foamed color body 52 of the multicolor shoe material 50 is seen from a bottom surface, the first holes 521 and the second hole 522 could present a color of the first foamed color body 51, so that the multicolor shoe material 50 could show a special color combination. In other embodiment, a number of the holes of the second foamed color body 52 could be at least one.

As illustrated in FIG. 22, the multicolor shoe material 50 is defined to have a first plane A1', wherein the first plane A1 is an adhesive interface between the first foamed color body 51 and the second foamed color body 52, so that a color of first foamed color body 51 and a color of the second foamed color body 52 are presented at two sides of the first plane A1, respectively. From an appearance of the multicolor shoe material 30, it is obvious to observe that the first foamed color body 51 and the second foamed color body 52 present different colors, respectively. The color of the first foamed color body 31 does not invade into the second foamed color body 32, vice versa. The multicolor shoe material 50 could be multi-function, wherein different parts of the multicolor shoe material 50 could have different densities and be made by different materials.

Figure 23:
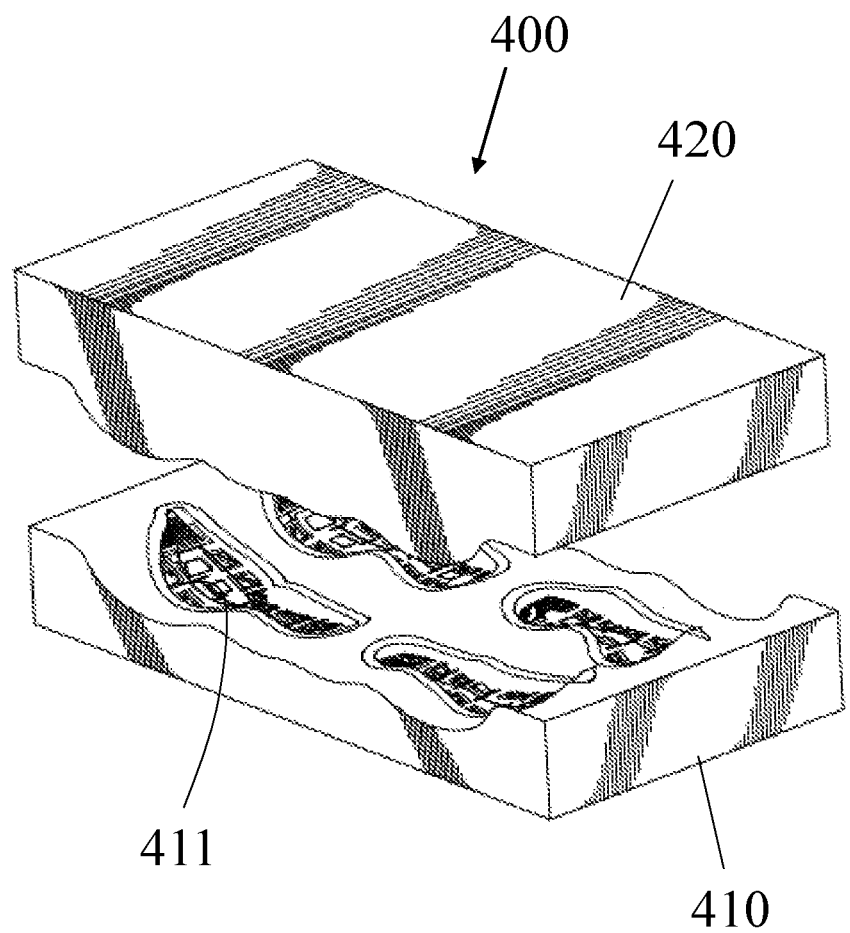
FIG. 23 is a perspective view of the foaming mold of a fourth embodiment according to the present invention.
Figure 24:
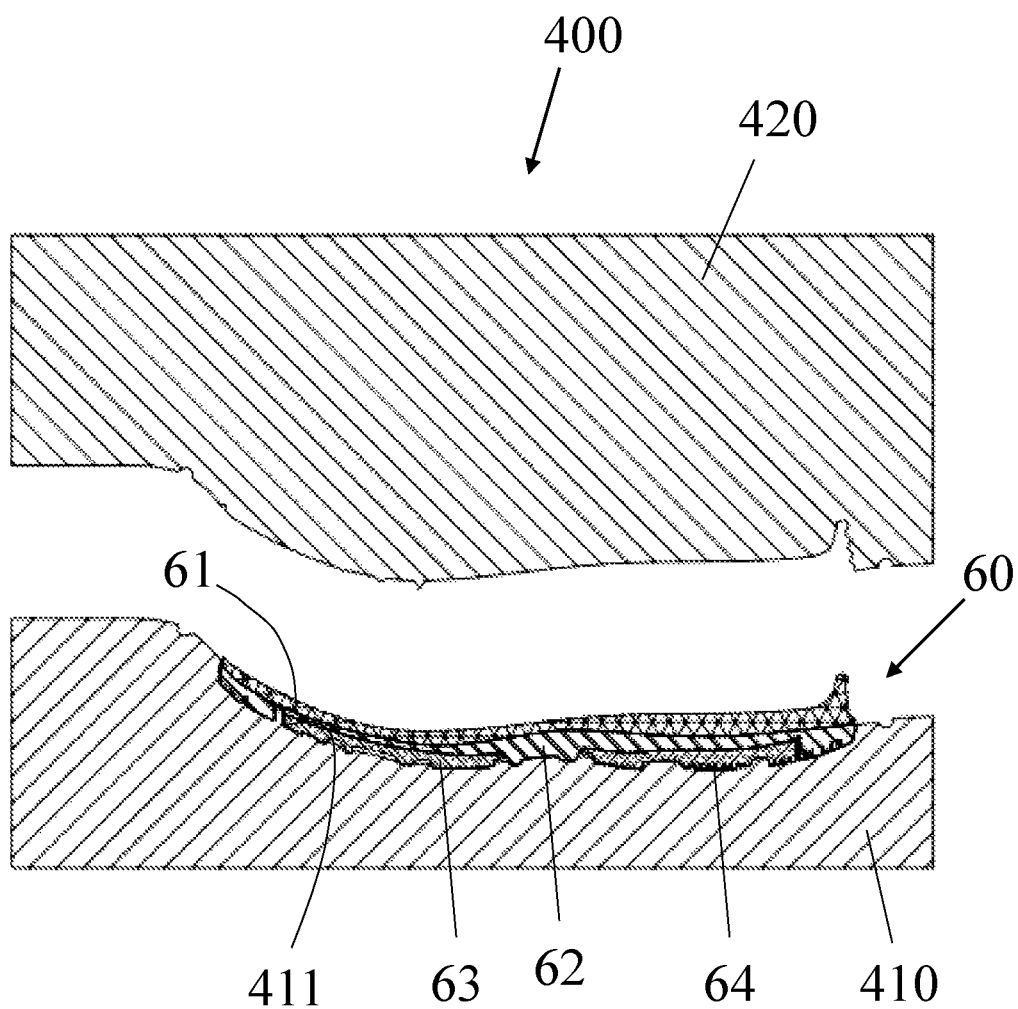
FIG. 24 is a sectional schematic view, showing the semi-finished product of the multicolor shoe material is put into the foaming mold of the fourth embodiment according to the present invention.
Figure 25:
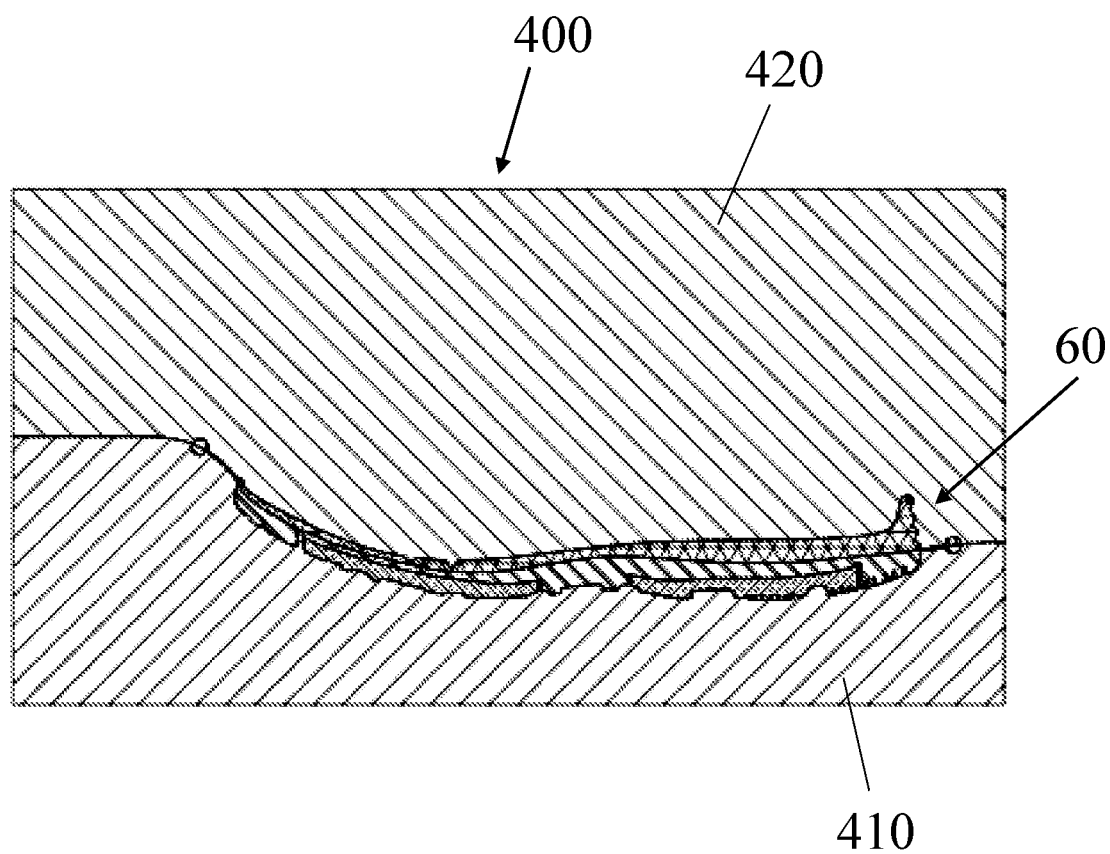
FIG. 25 is similar to FIG. 24, showing the foaming mold of the fourth embodiment is closed.

As illustrated in FIG. 23 to FIG. 29, another semi-finished product 60 and the multicolor shoe material 70 of a fourth embodiment according to the present invention, wherein the multicolor shoe material 70 of the fourth embodiment is an outsole of a sneaker having fourth colors. The multicolor shoe material 70 is formed by foaming four of the semi-finished products 60, wherein the semi-finished products 60 includes a shoe pad blank 61, a shoe sole blank 62, a first outsole pattern blank 63, and a second outsole pattern blank 64. The shoe pad blank 61, the shoe sole blank 62, the first outsole pattern blank 63, and the second outsole pattern blank 64 are put into a foaming mold 400. The foaming mold 400 includes a lower mold 410 and an upper mold 420. As illustrated in FIG. 23 to FIG. 25, during a manufacturing process, the first outsole pattern blank 63 and the second outsole pattern blank 64 are put into the lower mold 410, wherein the first outsole pattern blank 63 and the second outsole pattern blank 64 are adjacent and spaced to each other. After that, the shoe sole blank 62 is put on the first outsole pattern blank 63 and the second outsole pattern blank 64. Finally, the shoe pad blank 61 is put on the shoe sole blank 62. A cavity 411 of the lower mold 410 has a plurality of protrusions (not shown) that surround a circumference of the first outsole pattern blank 63 and a circumference of the second outsole pattern blank 64, thereby isolating the shoe sole blank 62 from contacting the circumferences of the first outsole pattern blank 63 and the second outsole pattern blank 64. Thus, when the shoe sole blank 62 is put in the lower mold 410, the shoe sole blank 62 surrounds the circumferences of the first outsole pattern blank 63 and the second outsole pattern blank 64 without contacting thereof, thereby separating the first outsole pattern blank 63 and the second outsole pattern blank 64 apart.

Figure 26:
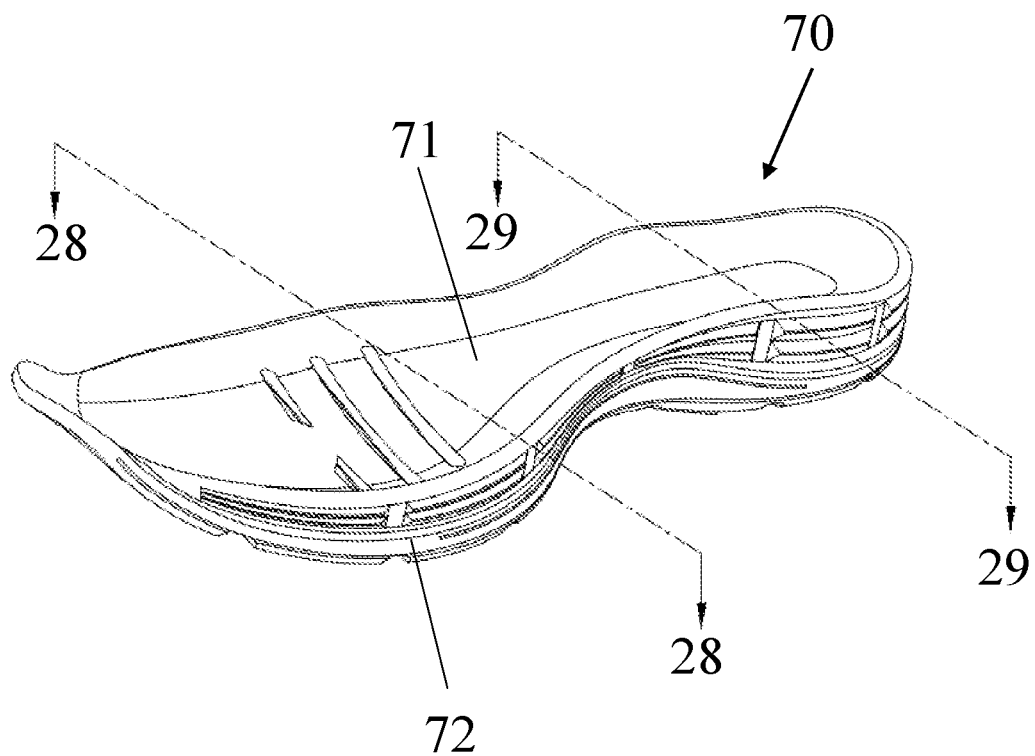
FIG. 26 is a perspective view of the multicolor shoe material of the fourth embodiment according to the present invention.
Figure 27:
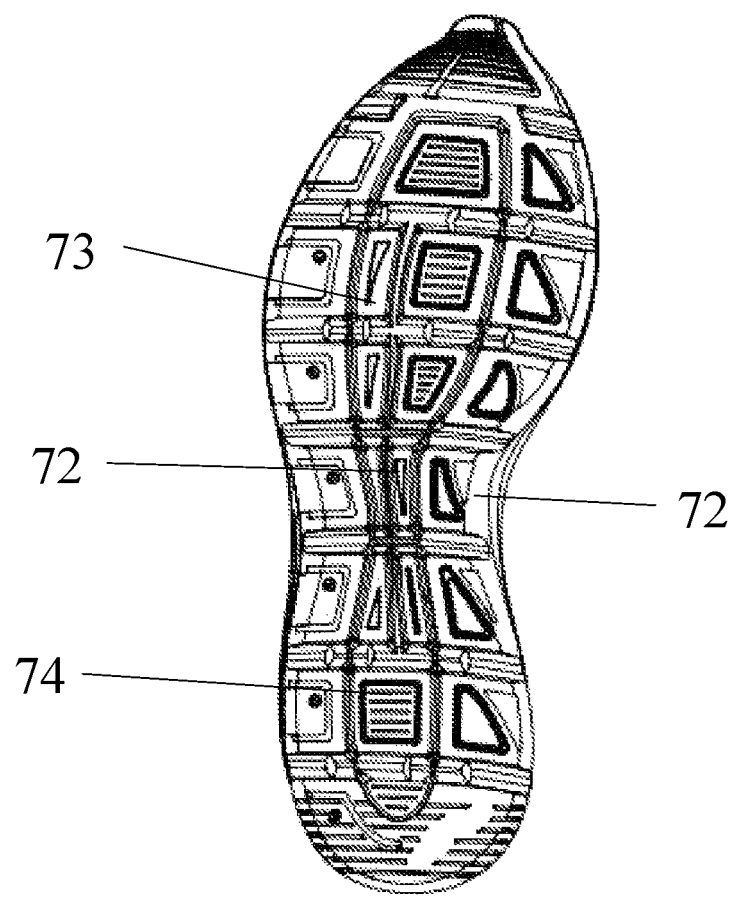
FIG. 27 is a bottom view of the multicolor shoe material of the fourth embodiment according to the present invention.

When the foaming mold 400 is demolded, a multicolor shoe material 70 that is completely foamed could be obtained (as shown in FIG. 26 and FIG. 27). The multicolor shoe material 70 is a shoe sole of a sneaker presented in four different colors. The multicolor shoe material 70 has different hardnesses, functions, and densities in different parts. As illustrated in FIG. 26 to FIG. 29, the multicolor shoe material 70 includes a first foamed color body 71, a second foamed color body 72, a third foamed color body 73, and a fourth foamed color body 74. In the fourth embodiment, the first foamed color body 71 is a shoe pad of the multicolor shoe material 70. The second foamed color body 72 is a shoe sole of the multicolor shoe material 70. The third foamed color body 73 and the fourth foamed color body 74 are outsole patterns of the multicolor shoe material 70. The first foamed color body 71 and the second foamed color body 72 are thermally fused. The third foamed color body 73 and the fourth foamed color body 74 are located at a bottom side of the second foamed color body 72 and are thermally fused with the second foamed color body 72. Since the protrusions in the foaming mold 400 could separate the circumference of the first outsole pattern blank 63 and the circumference of the second outsole pattern blank 64 from the shoe sole blank 12, colors of the third foamed color body 73, the fourth foamed color body 74, and the second foamed color body 72 are not mixed with one another after foaming.

Figure 28:
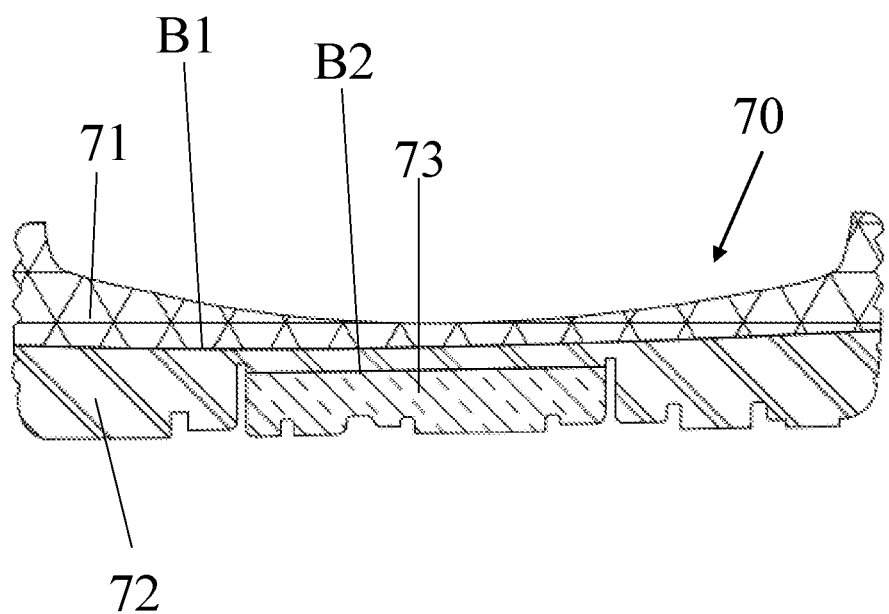
FIG. 28 is a sectional view taken along the 28-28 line in FIG. 26.
Figure 29:
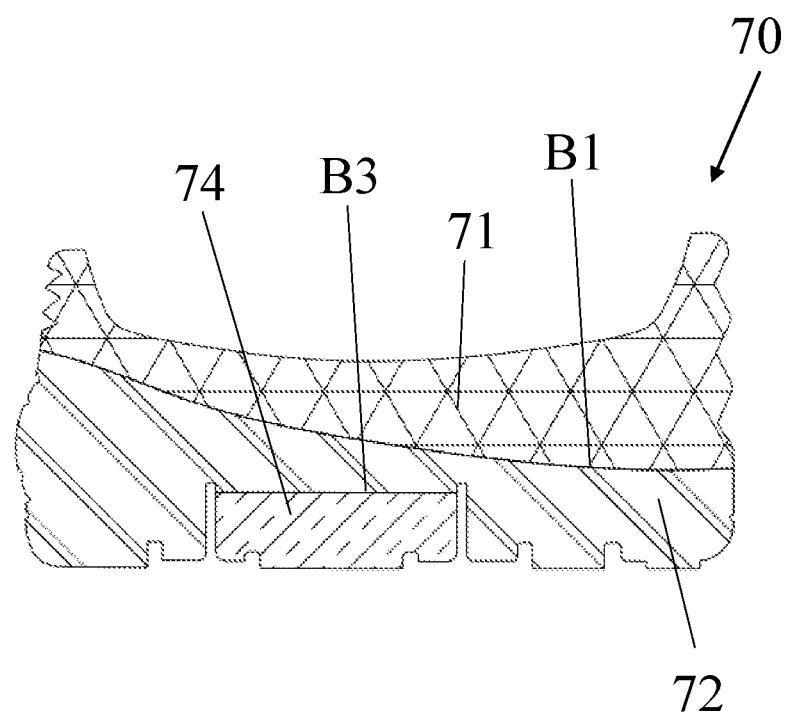
FIG. 29 is a sectional view taken along the 29-29 line in FIG. 26.

As illustrated in FIG. 28 and FIG. 29, the multicolor shoe material 70 is defined to have a first plane B1, a second plane B2, and a third plane B3, wherein the first plane B1 is an adhesive interface between the first foamed color body 71 and the second foamed color body 72. A color of the first foamed color body 71 and a color of the second foamed color body 72 are presented at two sides of the first plane B1, respectively. The second plane B2 is an adhesive interface between the second foamed color body 72 and the third foamed color body 73. A color of the second foamed color body 72 and a color of the third foamed color body 73 are presented at two sides of the second plane B2, respectively. The third plane B3 is an adhesive interface between the second foamed color body 72 and the fourth foamed color body 74. The color of the second foamed color body 72 and a color of the fourth foamed color body 74 are presented at two sides of the third plane B3, respectively. Thus, the multicolor shoe material 70 could be presented in four different colors, and a boundary between any two of the four different colors is clear, thereby enhancing the color diversity and the aesthetic appearance of the multicolor shoe material 70. The multicolor shoe material 70 is multifunction and has physical properties, such as the density.

With such design, in the method of manufacturing the multicolor shoe material according to the present invention, the specific ratio of the total volume of the semi-finished product 10 to the volume of the mold chamber S of the foaming mold facilitates accuracy material feeding of the foaming mold 200 by using the semi-finished product 10. Therefore, the semi-finished products 10 in different colors could be evenly foamed in the foaming mold 200, and the colors of the semi-finished products 10 would not be mixed with each other, thereby improving the aesthetic appearance of the color combination of the multicolor shoe material 30. The multicolor shoe material having three or four different colors could be manufactured as well, thereby enhancing the variant of color combination and increasing functions of the multicolor shoe material. The visual appearance of the multicolor shoe material could be more aesthetic. Besides, the parts in different colors represent different physical properties and different functions. The multicolor shoe material of the present invention is beautiful, comfortable, and multifunctional.

Additionally, the density distribution of each of the semi-finished products 10 itself is uniform. By foaming the semi-finished product 10, the multicolor shoe material could be completely formed by foaming once, thereby promoting the yield of the multicolor shoe material manufactured by the method of the present invention.

It must be pointed out that the embodiment described above is only a preferred embodiment of the present invention. All equivalent structures and methods which employ the concepts disclosed in this specification and the appended claims should fall within the scope of the present invention.

What is claimed is:

1. A method of manufacturing a multicolor shoe material, comprising:
   step S1: providing a plurality of blank molds and injecting each of a plurality of foaming materials in different colors into a mold chamber of one of the blank molds, so that the blank molds form the plurality of foaming materials to obtain a plurality of semi-finished products that are in different colors and unfoamed, and wherein each of the plurality of foaming materials is selected from a group consisting of ethylene-vinyl acetate (EVA), synthetic rubber, and thermoplastic elastomer (TPE), and is injected under a condition wherein a screw temperature is lower than 130 Celsius degrees, wherein the screw temperature means a temperature of the screw in the injection molding machine; and
   step S2: cooling down the plurality of semi-finished products and putting the plurality of semi-finished products into a foaming mold, wherein each of the plurality of semi-finished products is selected from a group consisting of a shoe upper blank, a shoe sole blank, a shoe pad blank, an outsole pattern blank, and a shoe body blank, and wherein the plurality of semi-finished products are assembled according to a mold chamber contour of the foaming mold; when the foaming mold is closed, a ratio of a total volume of the plurality of semi-finished products to a volume of the mold chamber of the foaming mold ranges between 0.96 to 1.04, enabling the plurality of semi-finished products to be foamed evenly in the mold chamber of the foaming mold; after a foaming process, at least two of the plurality of semi-finished products are placed on top of each other to be thermally fused to form the multicolor shoe material.

2. The method as claimed in claim 1, wherein in the step S2, when the plurality of semi-finished products are cooled down, a ratio of a density of one of the plurality of semi-finished products to a density of another one of the plurality of semi-finished products ranges between 1 and 1.2; when each of the plurality of semi-finished products is divided into sections, a density difference between any two of the sections is in a range of 1% to 3%.

3. The method as claimed in claim 1, wherein in the step S2, the ratio of the total volume of the plurality of semi-finished products to the volume of the mold chamber of the foaming mold ranges between 1 to 1.02.

4. The method as claimed in claim 1, wherein in the step S1, a difference between a hardness of one of the plurality of semi-finished products and a hardness of another one of the plurality of semi-finished products is lower than 40 degrees.

5. The method as claimed in claim 1, wherein in the step S2, the foaming mold comprises a lower mold, an upper mold, and an internal core, the plurality of semi-finished products comprises the shoe upper blank and the shoe sole blank; the shoe sole blank is put into the lower mold of the foaming mold, and the shoe upper blank is disposed on the internal core of the foaming mold; while the foaming mold is closing, the upper mold of the foaming mold drives the internal core to move in a direction toward the lower mold until the foaming mold is closed; when the foaming mold is closed, the mold chamber of the foaming mold is the space between the internal core, the upper mold, and the lower mold, a peripheral surface of the shoe upper blank contacts with an inner wall of a cavity of the upper mold, a bottom surface of the shoe upper blank contacts with the shoe sole blank, and the shoe upper blank and the shoe sole blank is received by the mold chamber of the foaming mold formed between the internal core, the upper mold, and the lower mold.

6. The method as claimed in claim 5, wherein in the step S2, while the foaming mold is closing, the upper mold is moved toward the lower mold at a speed slower than 10 cm/s, so that a surface of the shoe sole blank is preheated and softened in a cavity of the lower mold.

7. The method as claimed in claim 5, wherein in the step S2, when the upper mold and the lower mold are closed, a gap between a cavity opening of the upper mold and a cavity opening of the lower mold is in a range of 0.01 mm to 0.05 mm.

8. The method as claimed in claim 5, wherein in the step S2, the shoe sole blank has at least one slot, and a cavity of the lower mold has a positioning block; when the shoe sole blank is put into the lower mold, the positioning block of the lower mold is correspondingly engaged with the at least one slot of the shoe sole blank.

9. The method as claimed in claim 5, wherein in the step S2, the semi-finished products further comprises the shoe pad blank; the shoe pad blank is disposed in a receiving groove on a bottom surface of the internal core; the receiving groove has a protrusion for separating the foaming materials in different colors surrounds a periphery of the shoe pad blank; when the shoe upper blank fits around the internal core, the shoe pad blank is located at an inner side of the shoe upper blank, and the protrusion is received by a groove located at the inner side of the shoe upper blank to prevent the periphery of the shoe pad blank from contacting with the shoe upper blank.

10. The method as claimed in claim 1, wherein in the step S2, the semi-finished products comprises the shoe pad blank, the shoe sole blank, a first outsole pattern blank, and a second outsole pattern blank; the first outsole pattern blank and the second outsole pattern blank are put into a cavity of a lower mold of the foaming mold; the cavity has a protrusion surrounds a circumference of the first outsole pattern blank and a circumference of the second outsole pattern blank; after that, the shoe sole blank is put into the cavity and is located on the first outsole pattern blank and the second outsole pattern blank; finally, the shoe pad blank is put on the shoe sole blank.

* * * * *